US010423150B2

(12) United States Patent
Wise et al.

(10) Patent No.: US 10,423,150 B2
(45) Date of Patent: Sep. 24, 2019

(54) SYSTEM AND METHOD FOR ORDER FULFILLMENT USING ROBOTS

(71) Applicants: Melonee Wise, San Jose, CA (US); Michael Ferguson, San Jose, CA (US)

(72) Inventors: Melonee Wise, San Jose, CA (US); Michael Ferguson, San Jose, CA (US)

(73) Assignee: Fetch Robotics, Inc., San Jose, CA (US)

( * ) Notice: Subject to any disclaimer, the term of this patent is extended or adjusted under 35 U.S.C. 154(b) by 169 days.

(21) Appl. No.: 15/512,054

(22) PCT Filed: Feb. 11, 2016

(86) PCT No.: PCT/US2016/017617
§ 371 (c)(1),
(2) Date: Mar. 16, 2017

(87) PCT Pub. No.: WO2016/130849
PCT Pub. Date: Aug. 18, 2016

(65) Prior Publication Data
US 2017/0336780 A1    Nov. 23, 2017

(51) Int. Cl.
*G05B 19/00* (2006.01)
*G05B 19/418* (2006.01)
*G06Q 10/08* (2012.01)
*G06F 7/00* (2006.01)

(52) U.S. Cl.
CPC ......... *G05B 19/418* (2013.01); *G06Q 10/087* (2013.01); *G05B 19/00* (2013.01); *G06F 7/00* (2013.01)

(58) Field of Classification Search
CPC ......... G05B 19/00; G05B 19/418; G06F 7/00; G06Q 10/087
See application file for complete search history.

(56) References Cited

U.S. PATENT DOCUMENTS

| 9,242,799 B1* | 1/2016 | O'Brien | B65G 1/1371 |
| 9,688,472 B1 | 6/2017 | Stubbs et al. | |
| 9,827,683 B1* | 11/2017 | Hance | B25J 9/162 |
| 10,192,195 B1* | 1/2019 | Brazeau | G06Q 10/087 |
| 2012/0029683 A1* | 2/2012 | Keller | B25J 9/1687 |
| | | | 700/214 |
| 2012/0143427 A1* | 6/2012 | Hoffman | G06Q 10/087 |
| | | | 701/23 |

(Continued)

FOREIGN PATENT DOCUMENTS

WO    WO2014/130937 A    8/2014

*Primary Examiner* — Robert T Nguyen
(74) *Attorney, Agent, or Firm* — J. Steven Svosoda

(57) ABSTRACT

A system for order fulfillment using one or more robots includes: a server configured to receive an order comprising an order item; inventory storage operably connected to the server, the inventory storage comprising order items; an actor robot operably connected to and selected by the server, the actor robot configured to perform one or more of picking the order item from inventory storage, moving the order item, and positioning the order item; and an order robot operably connected to the server, the order robot configured to collect the order item, wherein the order item is positioned by the actor robot so as to be accessible to the order robot, so as to perform order fulfillment using one or more robots.

24 Claims, 31 Drawing Sheets

(56) References Cited

U.S. PATENT DOCUMENTS

| | | | |
|---|---|---|---|
| 2013/0317642 A1* | 11/2013 | Asaria | G06Q 10/08 |
| | | | 700/216 |
| 2014/0157732 A1* | 6/2014 | Gasber | B65B 25/008 |
| | | | 53/473 |
| 2015/0032252 A1* | 1/2015 | Galluzzo | B25J 5/007 |
| | | | 700/218 |
| 2017/0183157 A9* | 6/2017 | Massey | B65G 1/1373 |
| 2018/0029797 A1* | 2/2018 | Hance | B65G 1/1373 |

* cited by examiner

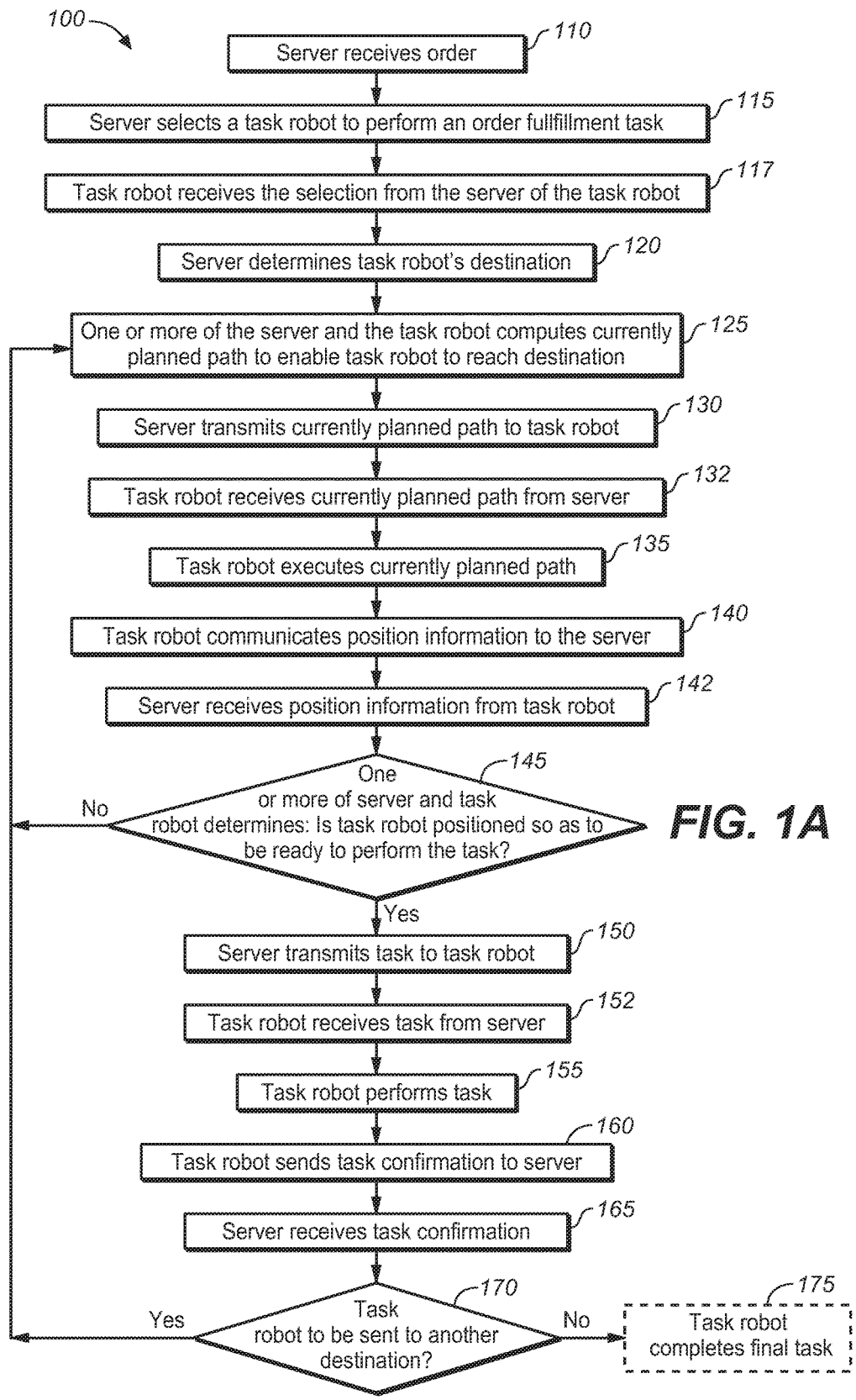

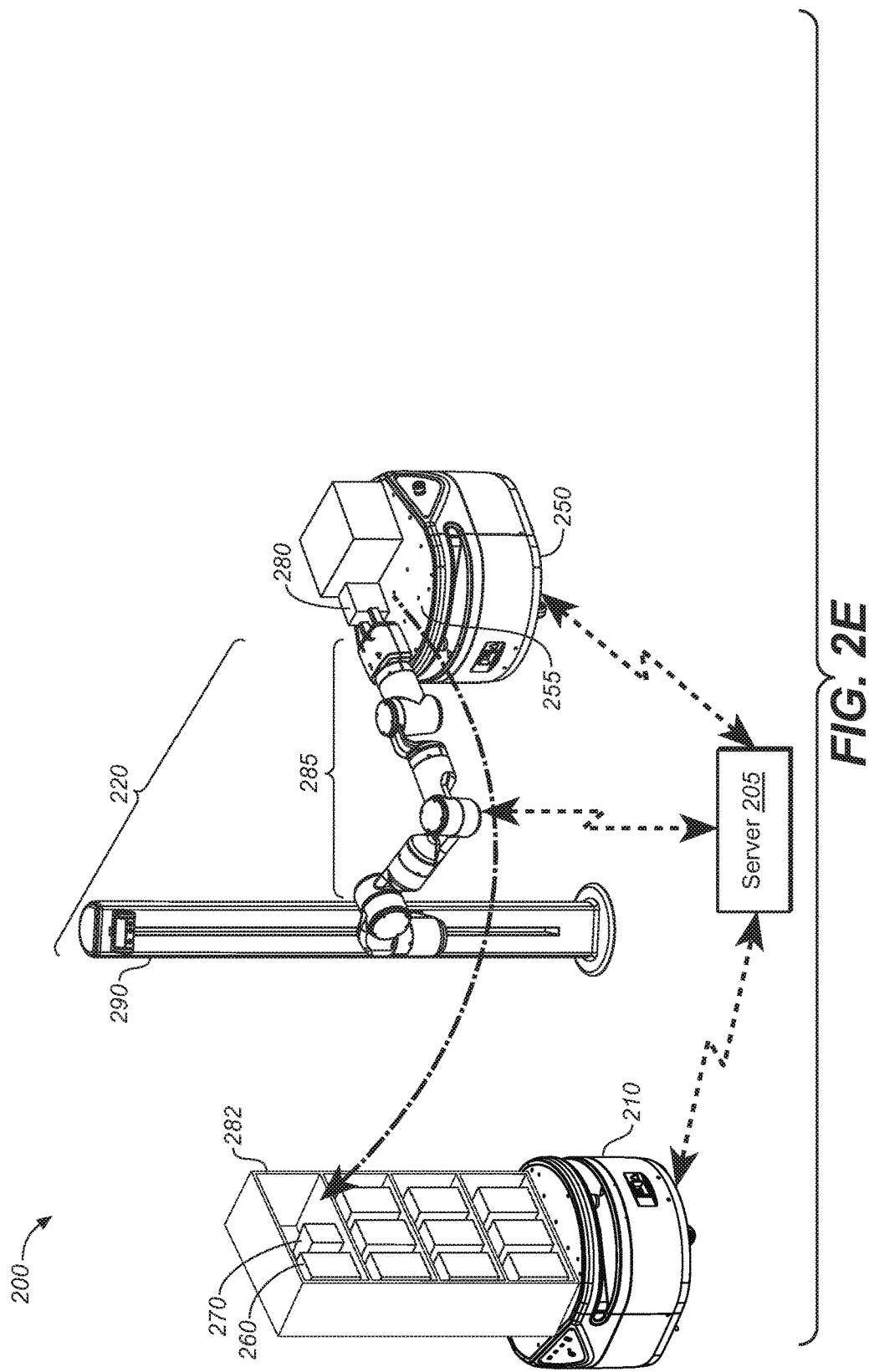

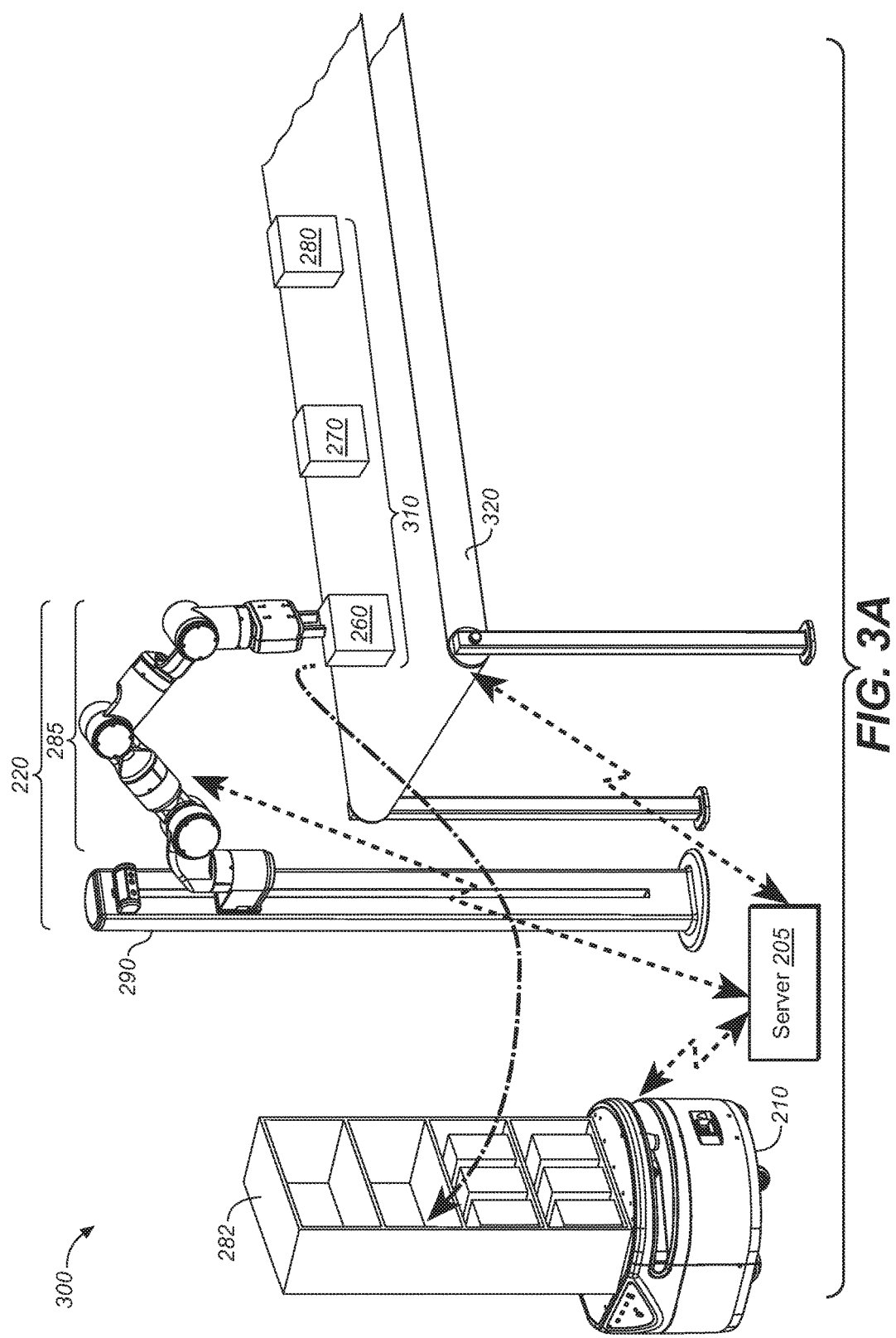

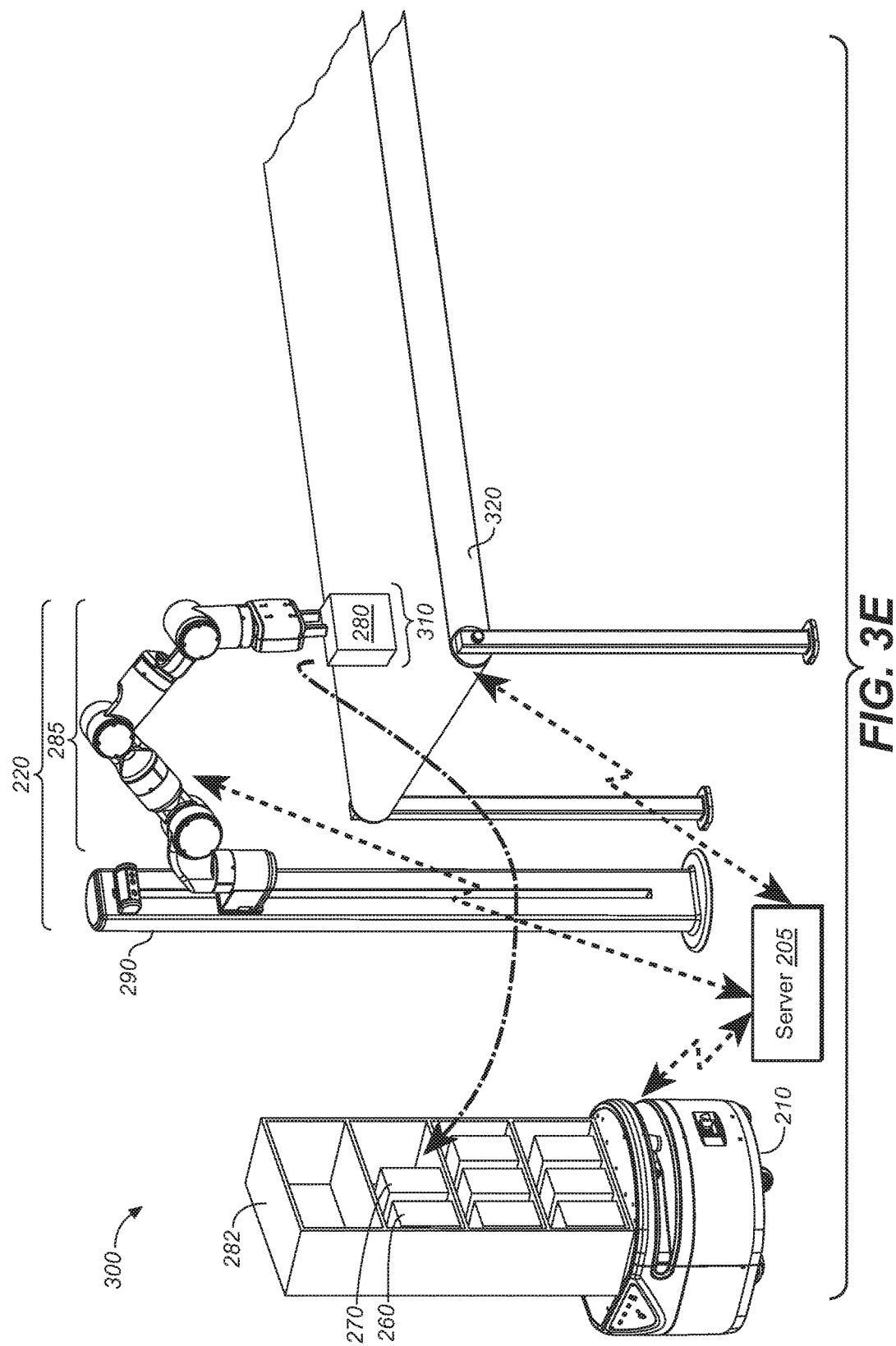

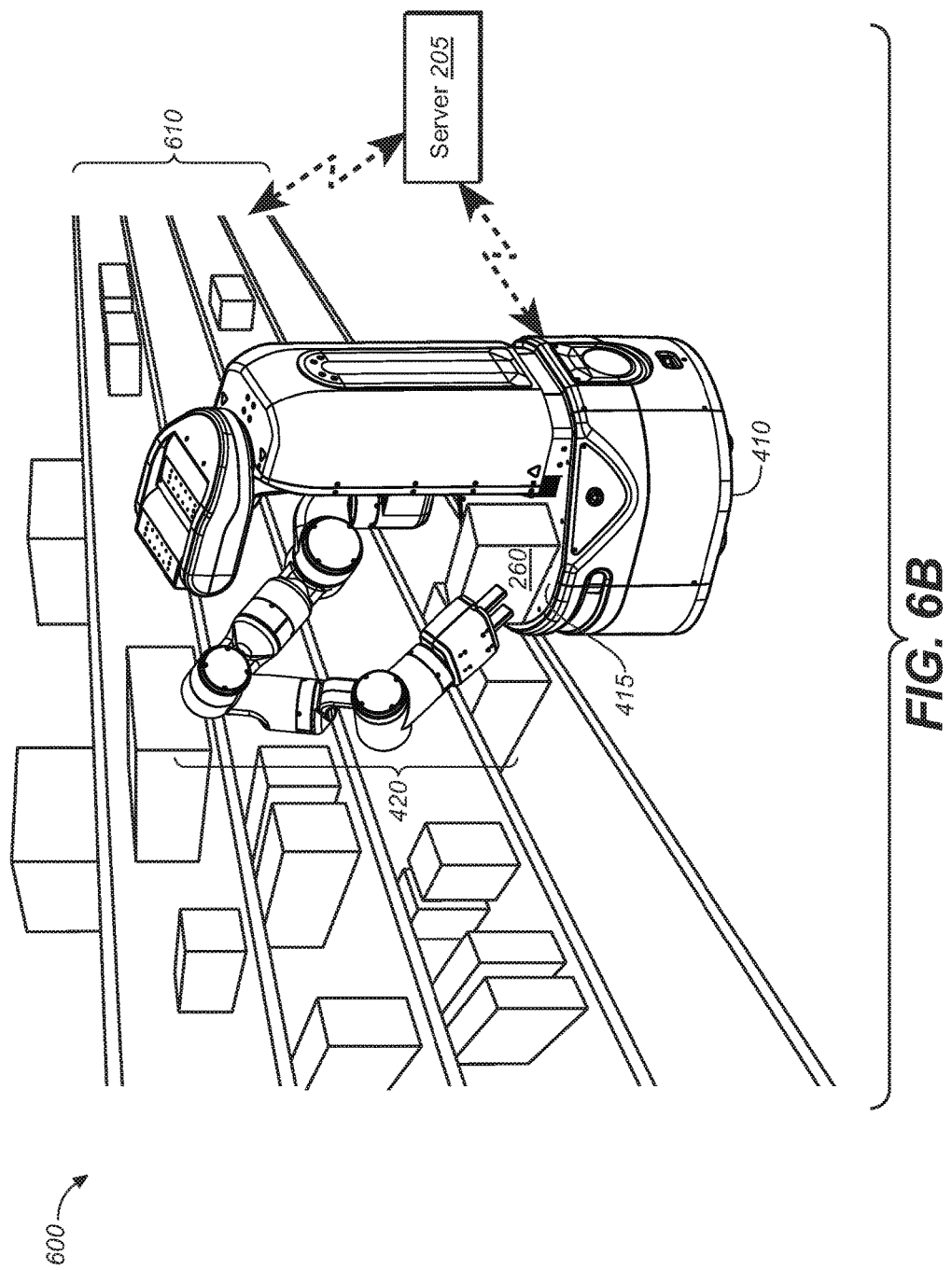

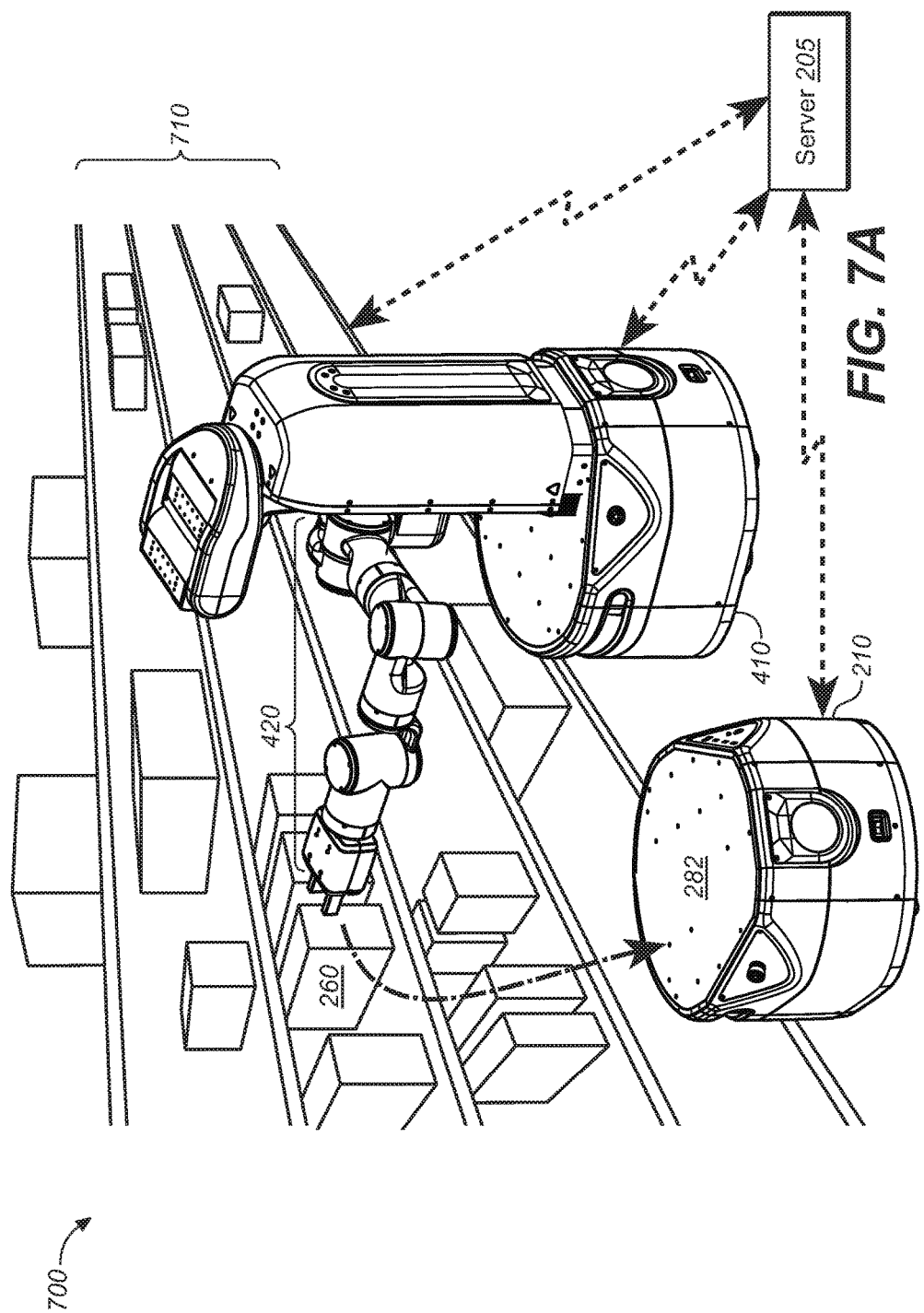

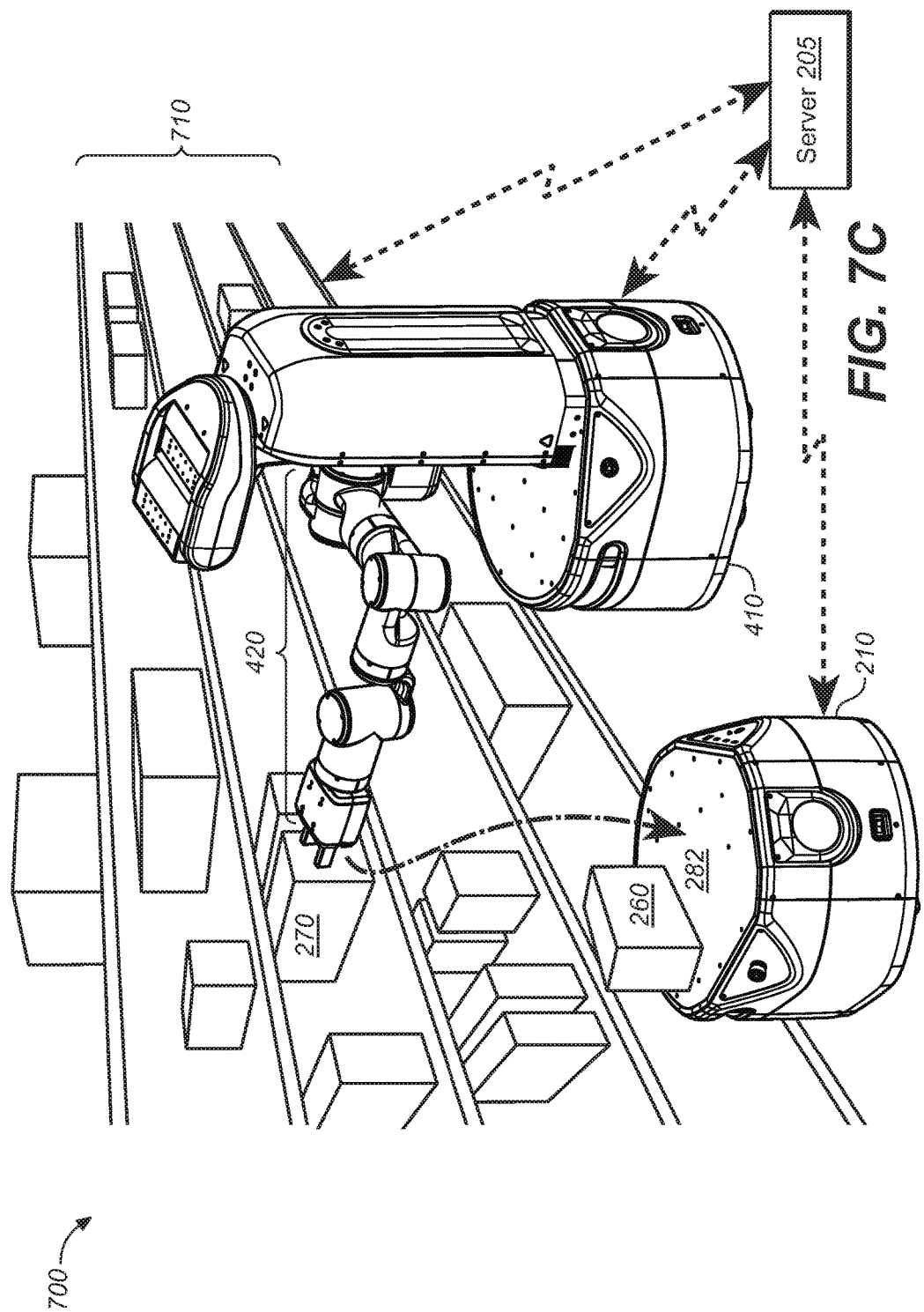

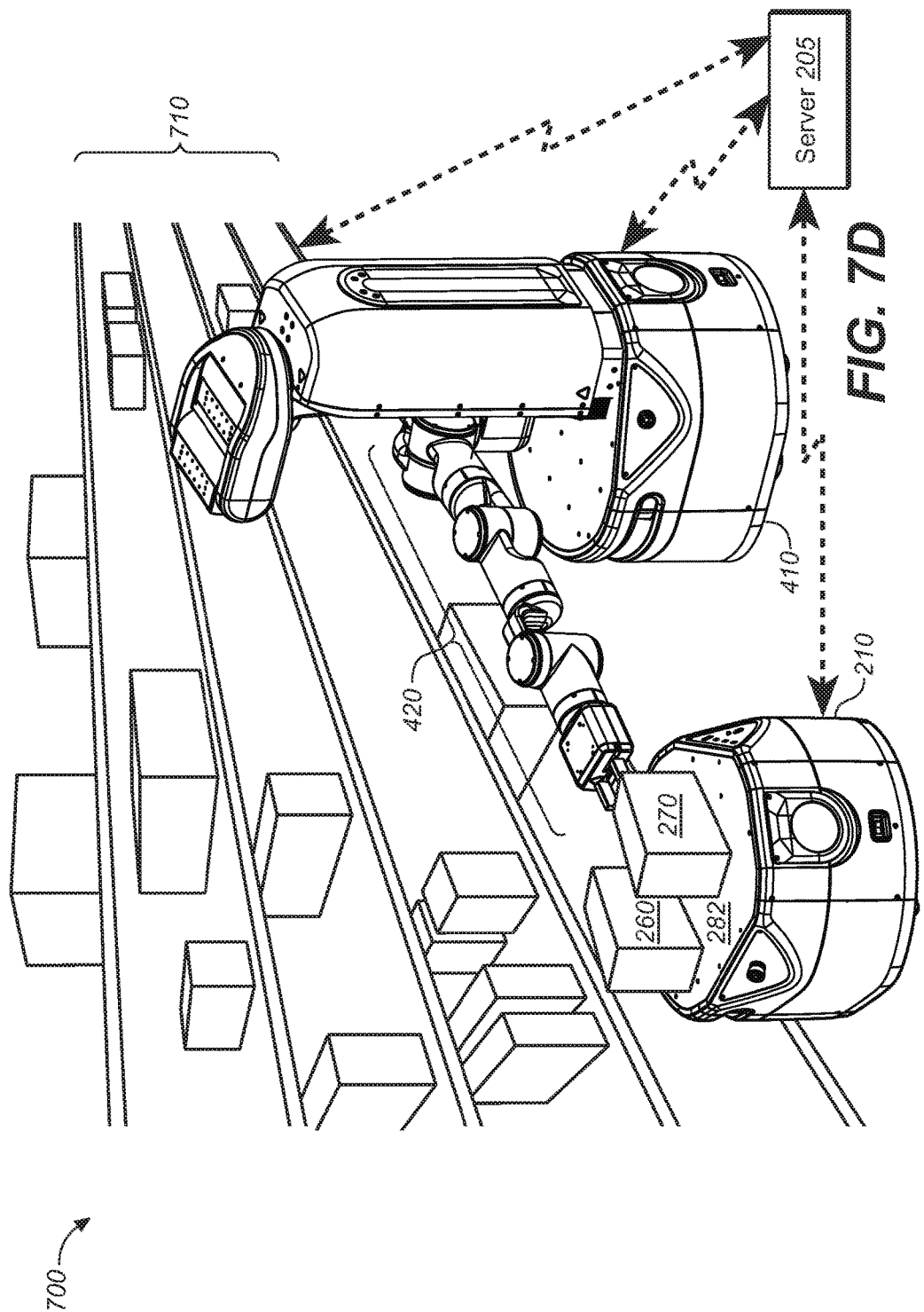

SYSTEM AND METHOD FOR ORDER FULFILLMENT USING ROBOTS

PRIORITY CLAIM

The present application claims the priority benefit of U.S. provisional patent application No. 62/115,440 filed Feb. 12, 2015 and entitled "System and Method for Order Fulfillment and Inventory Management Using Robots," and of U.S. provisional patent application No. 62/117,457 filed Feb. 18, 2015 and entitled "System and Method for Order Fulfillment Using Robots to Assist in Selecting Stock Items," the disclosures of which are incorporated herein by reference.

CROSS-REFERENCE TO RELATED APPLICATIONS

This application contains subject matter that is related to the subject matter of the following applications, which are assigned to the same assignee as this application. The below-listed applications are hereby incorporated herein by reference in its entirety:

"SYSTEM AND METHOD USING ROBOTS TO ASSIST HUMANS IN ORDER FULFILLMENT," by Wise, et al., co-filed herewith.

SUMMARY

This invention relates in general to order fulfillment systems, and more particularly to a system and method for order fulfillment to transport and manipulate inventory to fulfill orders.

A system for order fulfillment using one or more robots includes: a server configured to receive an order comprising an order item; inventory storage operably connected to the server, the inventory storage comprising order items; an actor robot operably connected to and selected by the server, the actor robot configured to perform one or more of picking the order item from inventory storage, moving the order item, and positioning the order item; and an order robot operably connected to the server, the order robot configured to collect the order item, wherein the order item is positioned by the actor robot so as to be accessible to the order robot, so as to perform order fulfillment using one or more robots.

Preferably, but not necessarily, the actor robot is configured to pick and move the order item. For example, the actor robot comprises a mobile actor robot. For example, the actor robot comprises a mobile actor robot configured to carry the order item. For example, the actor robot comprises a stationary actor robot. For example, the actor robot comprises a stationary actor robot configured to move the order item.

A system for order fulfillment using one or more robots includes: a server configured to receive an order comprising an order item; an inventory robot operably connected to the server, the inventory robot comprising order items; an actor robot operably connected to and selected by the server, the actor robot configured to perform one or more of receiving from the server and generating a currently planned path for the actor robot, the actor robot further configured to perform one or more of picking the order item, moving the order item, and positioning the order item; and an order robot operably connected to the server, the order robot configured to collect the order item, wherein the order item is positioned by the actor robot so as to be accessible to the order robot, so as to perform order fulfillment using one or more robots.

A method for order fulfillment using robots includes: receiving, by a server, an order comprising an order item; selecting, by the server, a task robot to perform a task relating to fulfillment of the order; receiving, by the server, position information from the task robot; determining, by the server, using the position information, that the task robot is positioned so as to be ready to perform the task; transmitting, by the server, the task to the task robot; and receiving, by the server, from the task robot, a task confirmation confirming that the task has been completed.

A method for order fulfillment using robots includes: receiving, by a task robot, from a server, a selection by the server of the task robot; computing, by the task robot, a currently planned path configured to enable the task robot to reach the destination while optimizing criteria of interest; executing, by the task robot, the currently planned path; communicating position information, by the task robot, to the server; determining, by the task robot, using the position information, that the task robot is positioned so as to be ready to perform a task relating to fulfillment of an order; receiving, by the task robot, from the server, the task; performing the task, by the task robot; and sending, to the server, by the task robot, a task confirmation confirmed that the task has been completed.

A method for order fulfillment using robots includes: receiving, by a server, an order comprising an order item; selecting, by the server, a task robot to perform a task relating to fulfillment of the order; determining, by the server, a destination for the task robot; computing, by the server, a currently planned path for the task robot configured to enable the task robot to reach the destination while optimizing criteria of interest; transmitting, by the server, the currently planned path to the task robot; receiving, by the task robot, from the server, the currently planned path; executing, by the task robot, the currently planned path; communicating position information, by the task robot, to the server; receiving, by the server, position information from the task robot; determining, by one or more of the server and the task robot, using the position information, that the task robot is positioned so as to be ready to perform the task; transmitting, by the server, the task to the task robot; receiving the task, by the task robot, from the server; performing the task, by the task robot; sending, to the server, by the task robot, a task confirmation confirmed that the task has been completed; receiving, by the server, from the task robot, the task confirmation; and determining, by the server, that the task robot is not to be sent to another destination.

DESCRIPTION OF THE DRAWINGS

FIGS. 1A-1B are a set of flow charts of a method for order fulfillment using robots.

FIGS. 2A-2F are a set of pictures that depict a system for order fulfillment using one or more robots, as used in a sequence of events in which a stationary actor robot picks ordered inventory from one or more inventory robots and positions the ordered inventory on an order robot.

FIGS. 3A-3F are a set of pictures that depict a system for order fulfillment using one or more robots, as used in a sequence of events in which a stationary actor robot picks ordered inventory from a conveyor and positions the ordered inventory on the order robot.

FIGS. 6A-6B are a set of pictures that depict a system for order fulfillment using one or more robots, as used in a sequence of events in which the mobile actor robot that is also the mobile order robot picks the first order item from inventory storage and positions the first order item so as to be accessible to the mobile order robot.

FIGS. 7A-7D are a set of pictures that depict a system for order fulfillment using one or more robots, as used in a sequence of events in which the mobile actor robot picks the first order item from a first inventory storage and positions the first order item so as to be accessible to the order robot, then picks the second order item from a second inventory storage and positions the second order item so as to be accessible to the order robot.

DETAILED DESCRIPTION

Figure 1B:
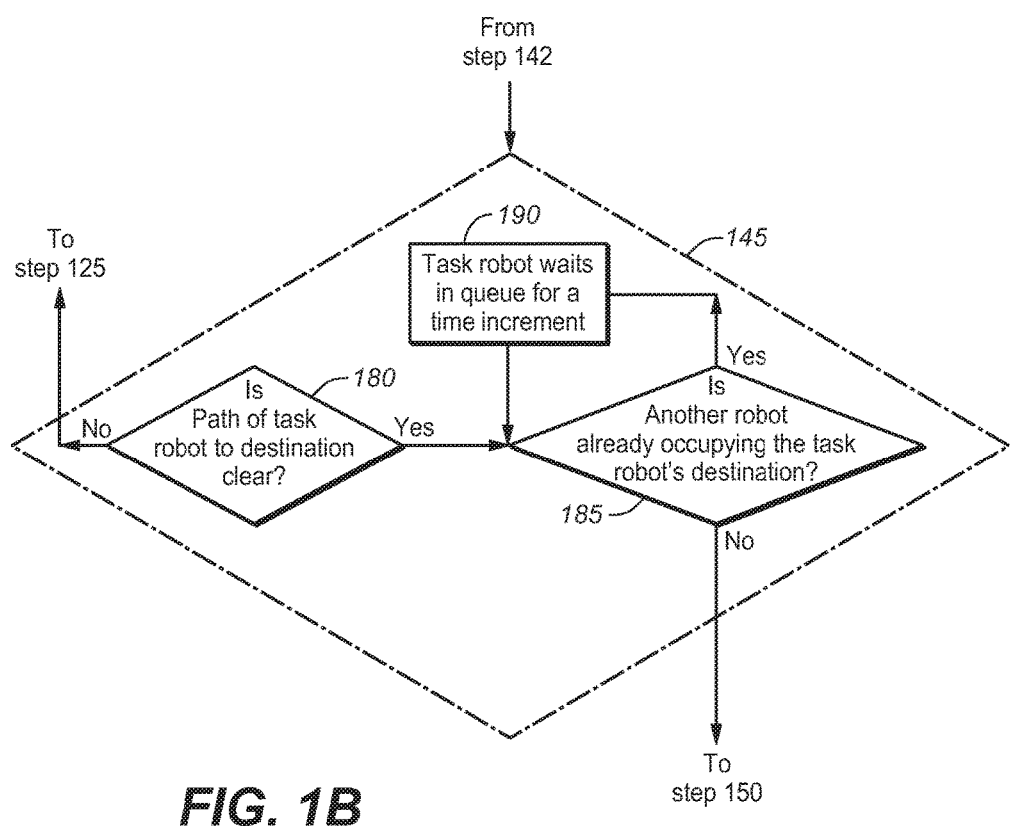

While the present invention is susceptible of embodiment in many different forms, there is shown in the drawings and will herein be described in detail one or more specific embodiments, with the understanding that the present disclosure is to be considered as exemplary of the principles of the invention and not intended to limit the invention to the specific embodiments shown and described. In the following description and in the several figures of the drawings, like reference numerals are used to describe the same, similar or corresponding parts in the several views of the drawings.

The system comprises a robot and a server configured to control the system. The server may be located in a warehouse. The server may be connected to the warehouse via one or more of a network connection, the cloud, a wired connection, and another connection. For example, the robot may comprise a robot base. According to an alternative set of embodiments, the robot base may not be constrained to the plane and may fly using one or more propellers. According to another alternative set of embodiments, the robot may move using actuated legs. According to yet another set of embodiments, the robot may move itself by balancing on a ball.

The system includes a plurality of components such as one or more of electronic components, hardware components, and computer software components. A number of such components can be combined or divided in the system. An example component of the system includes a set and/or series of computer instructions written in or implemented with any of a number of programming languages, as will be appreciated by those skilled in the art.

The system in one example employs one or more computer-readable signal-bearing media. The computer-readable signal bearing media store software, firmware and/or assembly language for performing one or more portions of one or more implementations of the invention. The computer-readable signal-bearing medium for the system in one example comprises one or more of a magnetic, electrical, optical, biological, and atomic data storage medium. For example, the computer-readable signal-bearing medium comprises one or more of floppy disks, magnetic tapes, CD-ROMs, DVD-ROMs, hard disk drives, downloadable files, files executable "in the cloud," electronic memory, and another computer-readable signal-bearing medium.

According to embodiments of the invention, the system receives an order. For example, the order comprises one or more items. For example, the order comprises an inventory management job. For example, the system comprises the inventory manager. For example, the system does not comprise the inventory manager.

According to embodiments of the invention, a server receives the order. For example, the server receives the order from a customer. For example, the server receives the order from an inventory manager.

According to further embodiments of the invention, using the order, the server transmits a task to a robot. For example the task is related to the order. For example, the task comprises an order fulfillment task related to the order.

According to other embodiments of the invention, the robot accepts the task from the server. According to further embodiments of the invention, the robot performs the task. For example, the task comprises a direction to a robot to pick one or more items comprised in the order. For example, the robot picks the one or more items from one or more inventory storages that comprises the one or more items. Inventory storage comprises one or more of an inventory robot, a box, a bin, a fixed shelf, a non-fixed shelf, a rack, a conveyor, a warehouse, another inventory storage location, and other inventory storage.

Packing of the one or more items may be performed. For example, the packing may be performed by a packing robot. Shipping of one or more of the one or more items may be performed. For example, the shipping may be performed by a packing robot.

According to further embodiments of the invention, the one or more robots may be configured to move one or more inventory items. According to other embodiments of the invention, the one or more robots may be configured to manipulate one or more inventory items. For example, the one or more inventory items may be located in one or more warehouses. According to yet other embodiments of the invention, the one or more robots may communicate wirelessly with the server.

According to further embodiments of the invention, the system comprises software.

For example, the software comprises one or more of order fulfillment software and inventory management software. For example, the software may be comprised in one or more of a server, one or more of the one or more robots, in the cloud, and in other software locations.

The software may be configured to assign one or more orders to one or more specific robots. The software may be further configured to select an inventory item. For example, the software may be configured to select an inventory item that comprises an order item. The software may be further configured to assign the order item to a designated robot. For example, an action may comprise one or more of locating an order item, picking an order item, transporting an order item, and packing an order item. For example, picking an order item comprises picking an order item from storage. For example, the server may parse an order out to a robot as a pick order. For example, a pick order comprises one or more of locating an order item and picking an order item. For example, when a robot has completed a designated action, it may send a confirmation to the system that it has completed the designated action. For example, when a robot has completed a pick, it may send a confirmation to the system that it has completed the pick. For example, the server may split among more than one robot the assignment of the items of an order. According to another set of embodiments, the server may also cancel an assignment of a robot to one or more of a designated action and a designated item.

According to other embodiments of the invention, the server is configured to plan a path for execution by one or more robots of one or more assignments. For example, the path may be an optimal path. For example, the path may be a time optimal path. For example, the path may be a cost optimal path. For example, the system may comprise optimization software. For example, one or more of the server, one or more of the one or more robots, the cloud, and other software locations may comprise the optimization software.

For example, the optimization software may plan a path that avoids one or more obstacles. For example, the one or more obstacles may comprise one or more of a human, another robot, a structure, and another obstacle. For example, following the path planned by the optimization software, the robot may execute the path while avoiding the one or more obstacles. For example, the optimization software may plan the path using one or more of a laser scanner, a depth camera, a red-green-blue (RGB) camera, another camera, an ultrasonic sensor, a radar sensor, and another sensor. For example, the sensor may be a time of flight sensor. For example, the system may be configured, in case an order is canceled, to re-plan a new path. For example, the new path may be re-planned between one or more new destination locations. For example, the system may be configured to dynamically re-plan the new path. For example, the robot may be configured to dynamically re-plan the path.

According to other embodiments of the invention, the system may use position information received from a task robot to prepare a task. The task robot comprises one or more of an inventory robot, an order robot, an actor robot, and a packer robot. For example, the system may use the position information to prepare a task for a robot. For example, the system may use the position information to prepare a task for a robot to perform one or more of pausing, waiting for a designated duration of time, and waiting until a designated event occurs. For example, the designated event may comprise an arrival of a robot at a designated location. For example, preparing a task for a robot to wait until the arrival of a robot at a designated location may help perform one or more of avoiding interference with other robots and minimizing interference with other robots.

According to further embodiments of the invention, an order can be fulfilled in a number of several different ways. For example, a pick order can be fulfilled in a number of different ways. For example, a pick order can be fulfilled in a number of different ways depending on details of one or more of a warehouse and another inventory storage location. For example, a pick order can be fulfilled in a number of different ways depending on an automation configuration of one or more of a warehouse and another inventory storage location. For example, one or more of items and inventory may be moved around the inventory storage location by one or more robots.

According to other embodiments of the invention, the robots comprise one or more of inventory robots, order robots, actor robots, and packer robots. According to further embodiments of the invention, the actor robots comprise one or more of stationary actor robots and mobile actor robots.

According to still further embodiments of the invention, inventory robots may comprise robots configured to perform one or more of transportation of inventory and manipulation of inventory. For example, an inventory robot may comprise an inventory robot base.

For example, the inventory robot may be configured to move inventory. For example, the inventory robot may be configured to carry inventory. For example, the inventory robot may be configured to carry inventory on top of itself. For example, the inventory robot may be configured to carry inventory inside itself. In some embodiments, inventory may be contained within one or more of boxes, bins, shelves, and the like.

According to yet other embodiments of the invention, order robots may comprise robots configured to collect order items. For example, an order robot may comprise one or more of an order bin, an order shelf, and an order box. For example, the order robot may comprise an order robot base. For example, an order robot may comprise a mobile order robot base. For example, a mobile order robot may transport one or more of an order bin, an order shelf, and an order box.

According to further embodiments of the invention, an actor robot may be configured to perform an action. For example, an actor robot may be configured to perform one or more of picking one or more order items from inventory storage, moving the order item, and positioning the order item so as to be accessible to an order robot. An actor robot comprises one or more of a stationary actor robot and a mobile actor robot. An order item may comprise one or more of an inventory item, a product, and another order item. For example, the actor robot may be configured to transfer an order item between two robots. For example, the actor robot may be configured to pick an order item from one or more of an inventory robot and an order robot to one or more of an inventory robot and an order robot. As another example, the actor robot may be configured to transfer an order item between a robot and the inventory storage. As a further example, the actor robot may be configured to transfer an order item between two inventory storages. The inventory storage may comprise one or more of one or more of a box, a bin, a fixed shelf, a non-fixed shelf, a rack, and other inventory storage.

For example, a stationary actor robot may comprise one or more arms. For example, one or more of the one or more arms may be mobile. For example, one or more of the one or more arms may be fixed. For example, one or more of the one or more arms may be configured to pick an order item.

According to further embodiments of the invention, one or more actor robots may meet at a pick location in an inventory storage location where inventory is picked by one or more of the one or more stationary actor robots. For example, the inventory may be picked from one or more of a robot and inventory storage. For example, the inventory may be transferred to one or more of a robot and inventory storage. An order may thereby be partially or completely filled.

According to other embodiments of the invention, a packer robot may be configured to pack one or more picked order items into a box or other container to be shipped.

Any logic or application described herein that comprises software or code can be embodied in any non-transitory computer-readable medium for use by or in connection with an instruction execution system in a computer system or other system. In this sense, the logic may comprise, for example, statements including instructions and declarations that can be fetched from the computer-readable medium and can be executed by the instruction execution system. In the context of the present disclosure, a computer-readable medium can be any medium that can contain, store, or maintain the logic or application described herein for use by or in connection with the instruction execution system. For example, the computer-readable medium may comprise one or more of random access memory (RAM), read-only memory (ROM), hard disk drive, solid-state drive, USB flash drive, memory card, floppy disk, optical disc such as compact disc (CD) or digital versatile disc (DVD), magnetic tape, and other memory components. For example, the RAM may comprise one or more of static random access memory (SRAM), dynamic random access memory (DRAM), magnetic random access memory (MRAM), and other forms of RAM. For example, the ROM may comprise one or more of programmable read-only memory (PROM), erasable programmable read-only memory (EPROM), electrically erasable programmable read-only memory (EEPROM), and other forms of ROM.

FIGS. 1A-1B are a set of flow charts of a method 100 for order fulfillment using robots.

FIG. 1A is a flow chart of a method 100 for order fulfillment using robots.

The order of the steps in the method 100 is not constrained to that shown in FIG. 1A or described in the following discussion. Several of the steps could occur in a different order without affecting the final result.

In step 110, a server receives an order. For example, the server receives a pick order instructing an actor robot to pick one or more order items ordered by a user. For example, the pick order is received from another part of the system. For example, the pick order is received directly from the user. Block 110 then transfers control to block 115.

In step 115, the server selects a task robot to perform a task relating to fulfillment of the order. For example, the task robot comprises an order robot. For example, the task comprises a pick order for a task robot to pick an order item. Block 115 then transfers control to block 117.

In step 117, the task robot receives from the server the selection of the task robot. Block 117 then transfers control to block 120.

In step 120, the server determines a destination for the task robot. The destination is determined so as to enable the task robot to perform its task. Block 120 then transfers control to block 125.

In step 125, one or more of the server and the task robot computes a currently planned path configured to enable the task robot to reach the destination while optimizing criteria of interest. For example, the currently planned path comprises an initial planned path. For example, the currently planned path comprises a revised planned path. For example, the criteria of interest comprise one or more of the expense of the currently planned path and the time required to execute the currently planned path. For example, the currently planned path optimizes one or more of the expense of the currently planned path and the time required to execute the currently planned path. For example, the currently planned path minimizes one or more of the expense of the currently planned path and the time required to execute the currently planned path. For example, the currently planned path is computed assuming an obstacle-free path to the destination. For example, the currently planned path is computed assuming a path to the destination that is obstacle-free apart from one or more known obstacles. Block 125 then transfers control to block 130.

In step 130, the server transmits the currently planned path to the task robot. Block 130 then transfers control to block 132.

In step 132, the task robot receives the currently planned path from the server. Block 132 then transfers control to block 135.

In step 135, the task robot executes the currently planned path. Block 135 then transfers control to block 140.

In step 140, the task robot communicates position information to the server. For example, the position information comprises a position of the task robot. For example, the position information comprises a present position of the task robot. For example, the position information comprises a past position of the task robot. For example, the position information comprises a future position of the task robot. For example, the position information comprises position information affecting the task robot's currently planned path. For example, the position information comprises position information regarding an obstacle affecting the task robot's currently planned path. For example, the position information comprises position information regarding an obstacle preventing timely and cost-effective execution of the task robot's currently planned path. For example, the position information comprises position information regarding an obstacle blocking the task robot's current planned path.

For example, the task robot may communicate position information comprising one or more planned future positions to the server. For example, the task robot may communicate with an intermediary server that then communicates with the server. For example, the task robot may communicate wirelessly with the server. For example, the task robot may communicate non-wirelessly with the server. Block 140 then transfers control to block 142.

In block 142, the server receives the position information from the task robot. Block 142 then transfers control to block 145.

In step 145, one or more of the server and the task robot determines whether the task robot is positioned so as to be ready to perform the task. If no, the process loops back to step 125 for computation of a new currently planned path. If yes, the process proceeds to block 150.

In step 150, the server transmits the task to the task robot. For example, the server transmits to the task robot a pick order instructing the task robot to pick an order item. Block 150 then transfers control to block 152.

In step 152, the task robot receives the task from the server. Block 152 then transfers control to block 155.

In step 155, the task robot performs the task. For example, the task robot picks the order item. Block 155 then transfers control to block 160.

In step 160, the task robot sends a task confirmation to the server confirming that the task has been completed. For example, the actor robot sends a pick confirmation confirming that the order item has been picked. If an expected task confirmation is not received, the server can stimulate its sending by requesting that the task robot send the server the task confirmation. FIGS. 2A-2F, 3A-3F, 4A-4B, 5A-5B, 6A-6B, and 7A-7D provide more detail regarding the picking process. Block 160 then transfers control to block 165.

In step 165, the server receives the task confirmation from the task robot. For example, the server receives the pick confirmation from the order robot. Block 165 then transfers control to block 170.

In step 170, the server determines whether the task robot is to be sent to another destination. If yes, the process loops back to step 125 for computation of a new currently planned path. If no, the process terminates. Alternatively, the process proceeds to optional block 175.

In optional step 175, the task robot completes a final task. For example, if the task comprises a pick order, the order robot loaded with picked order items transports itself to a packing station, where one or more packing robots pack the picked order items. For example, the packing robot packs the picked order items into boxes to be shipped to the customer. For example, the packing robot packs the picked order items into boxes to be shipped to the customer. FIGS. 8A-8F provide more detail regarding the packing process. Block 175 then terminates the process.

FIG. 1B is a flow chart showing exemplary sub-steps of step 145 in FIG. 1A of the method 100 for order fulfillment using robots.

The order of the sub-steps in the step 145 of the method 100 is not constrained to that shown in FIG. 1B or described in the following discussion. Several of the sub-steps could occur in a different order without affecting the final result.

In step 180, the server asks the robot to determine whether the path of the task robot to the destination is clear. If no, the process loops back to step 125 in FIG. 1A for computation of a new currently planned path. If yes, the process proceeds to block 185.

In step 185, it is queried whether another robot other than the task robot is already occupying the task robot's destination. If yes, the process proceeds to block 190. If no, the process proceeds to step 150 in FIG. 1A.

In block 190, the task robot waits in queue for a time increment. For example, the time increment is predetermined. For example, the time increment is calculated using predetermined parameters. The process then loops back to block 185.

FIGS. 2A-2F are a set of pictures that depict a system 200 for order fulfillment using one or more robots as used in a sequence of events in which a stationary actor robot picks ordered inventory from one or more inventory robots and positions the ordered inventory on an order robot. The system 200 includes a server 205 configured to receive an order comprising an order item.

FIGS. 2A-2F depict an order robot 210 that is operably connected to the server 205, a stationary actor robot 220, a first inventory robot 230 comprising a first inventory storage 235 that is operably connected to the server 205, a second inventory robot 240 comprising a second inventory storage 245 that is operably connected to the server 205, and a third inventory robot 250 comprising a third inventory storage 255 that is operably connected to the server 205. Additionally, or alternatively, one or more of the first inventory robot 230, the second inventory robot 240, and the third inventory robot 250 is operably connected to the server 205. Optionally, one or more of the first inventory storage 235, the second inventory storage 245, and the third inventory storage 255 comprises one or more inventory shelves. As depicted, only the first inventory storage 235 comprises one or more inventory shelves 257A, 257B, 257C, 257D, and 257E.

One or more of the first inventory robot 230, the second inventory robot 240, and the third inventory robot 250 is used to move one or more of a first order item 260, a second order item 270, and a third order item 280. As shown, the first inventory robot 230 comprises the first order item 260 and is used to move the first order item 260, the second inventory robot comprises the second order item 270 and is used to move the second order item 270, and the third order robot 250 comprises the third order item 280 and is used to move the third order item 280. The depicted stationary actor robot 220 comprises a stationary robot arm 285. Optionally, and as depicted, the stationary robot arm 280 is mounted on a vertical lift 290.

Preferably, but not necessarily, the inventory robot 230, 240, 250 is configured to pick and move the order item 260, 270, 280.

The order robot 210 may comprise order storage 282. The order storage 282 may comprise one or more of an order bin, an order shelf, and an order box. For example, the order robot 210 may comprise the order robot base. For example, the order robot 210 may comprise a mobile order robot base.

The actor robot 220 comprises one or more of a stationary actor robot 220 and a mobile actor robot 220. The actor robot 220 is configured to perform one or more of receiving from the server 205 and generating a currently planned path for the actor robot 220. For example, the actor robot 220 may be configured to transfer an order item 260, 270, 280 between two robots. For example, the actor robot 220 may be configured to transfer an order item 260, 270, 280 from the respective inventory robot 230, 240, or 250 to one or more of the inventory robot 230, 240, or 250 and the order robot 210. As another example, discussed in detail in FIGS. 7A-7D, the actor robot 220 may be configured to transfer an order item 260, 270, 280 between a robot and the inventory storage. As another example, the actor robot 220 may be configured to transfer an order item 260, 270, 280 between two inventory storages. As another example, the actor robot 220 may be configured to perform one or more of picking the order item 260, 270, 280 from inventory storage, moving the order item 260, 270, 280, and positioning the order item 260, 270, 280. The inventory storage may comprise one or more of one or more of an inventory robot, a box, a bin, a fixed shelf, a non-fixed shelf, a rack, and other inventory storage.

For example, a stationary actor robot 220 may comprise one or more arms 285. For example, one or more of the one or more arms 285 may be mobile. As depicted, the arm 285 is mobile. For example, one or more of the one or more arms 285 may be fixed. For example, one or more of the one or more arms 285 may be configured to pick an order item 260, 270, 280.

For example, as depicted here, the second inventory robot 240 has the same design as the first inventory robot 230. For example, the second inventory robot 240 has a different design from the first inventory robot 230. For example, as depicted here, the third inventory robot 250 has the same design as one or more of the first inventory robot 230 and the second inventory robot 240. For example, the third inventory robot 250 has a different design from the design of one or more of the first inventory robot 230 and the second inventory robot 240.

One or more of the first inventory robot 230, the second inventory robot 240, and the third inventory robot 250 may comprise an inventory robot base. For example, an inventory robot may comprise a mobile inventory robot base. As depicted, the first inventory robot 230 comprises an inventory robot base 230. As depicted, the second inventory robot 240 comprises an inventory robot base 240. As depicted, the third inventory robot 250 comprises an inventory robot base 250. For example, one or more of the first inventory robot 230, the second inventory robot 240, and the third inventory robot 250 may be configured to carry inventory. For example, one or more of the first inventory robot 230, the second inventory robot 240, and the third inventory robot 250 may be configured to carry inventory on top of itself. For example, one or more of the first inventory robot 230, the second inventory robot 240, and the third inventory robot

250 may be configured to carry inventory inside itself. In some embodiments, as shown in more detail in FIGS. 6A-6B, inventory may be contained in inventory storage that may comprise, for example, one or more of boxes, bins, shelves, and the like, the inventory being given to the order robot. According to alternative embodiments, as shown in more detail in FIGS. 7A-7D, inventory may be picked from more than one inventory storage and given to the order robot. According to alternative embodiments, as shown in FIGS. 8A-8F, the order robot loaded with picked order items transports itself to a packing station, where packing robots pack the picked order items. For example, the packing robot packs the picked order items into boxes to be shipped to the customer.

FIGS. 2A-2F depict the system 200 for order fulfillment using robots as used in a sequence of events in which the stationary actor robot 220 picks ordered inventory items 260, 270, 280 from the one or more inventory robots 230, 240, 250 and positions the ordered inventory items 260, 270, 280 on the order robot 210. The order robot 210 comprises order storage 282. As shown, the order storage 282 comprises order shelves 282.

Figure 2A:
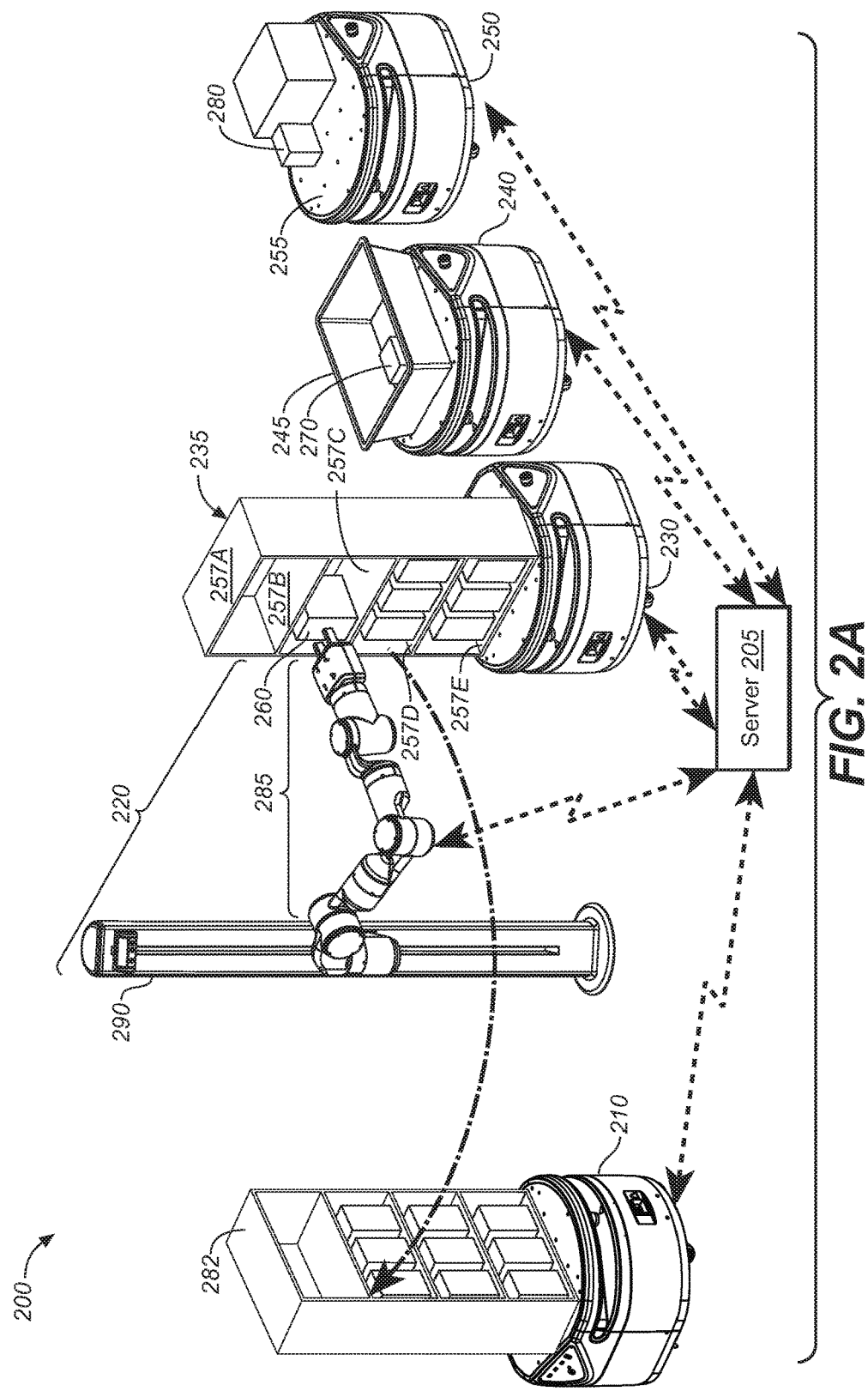

In FIG. 2A, the stationary actor robot 220 picks from the order a first order item 260 from the first inventory storage 235 comprised in the first inventory robot 230.

Alternatively, or additionally, separate inventory storage (not shown) may be positioned so as to be available to the stationary actor robot 220 so that it may be used for temporary storage of inventory items. For example, the inventory storage may comprise one or more of an inventory robot, a box, a bin, a fixed shelf, a non-fixed shelf, a rack, and other inventory storage. FIGS. 6A-6B and 7A-7D provide more detail regarding this alternative possibility.

Figure 2B:
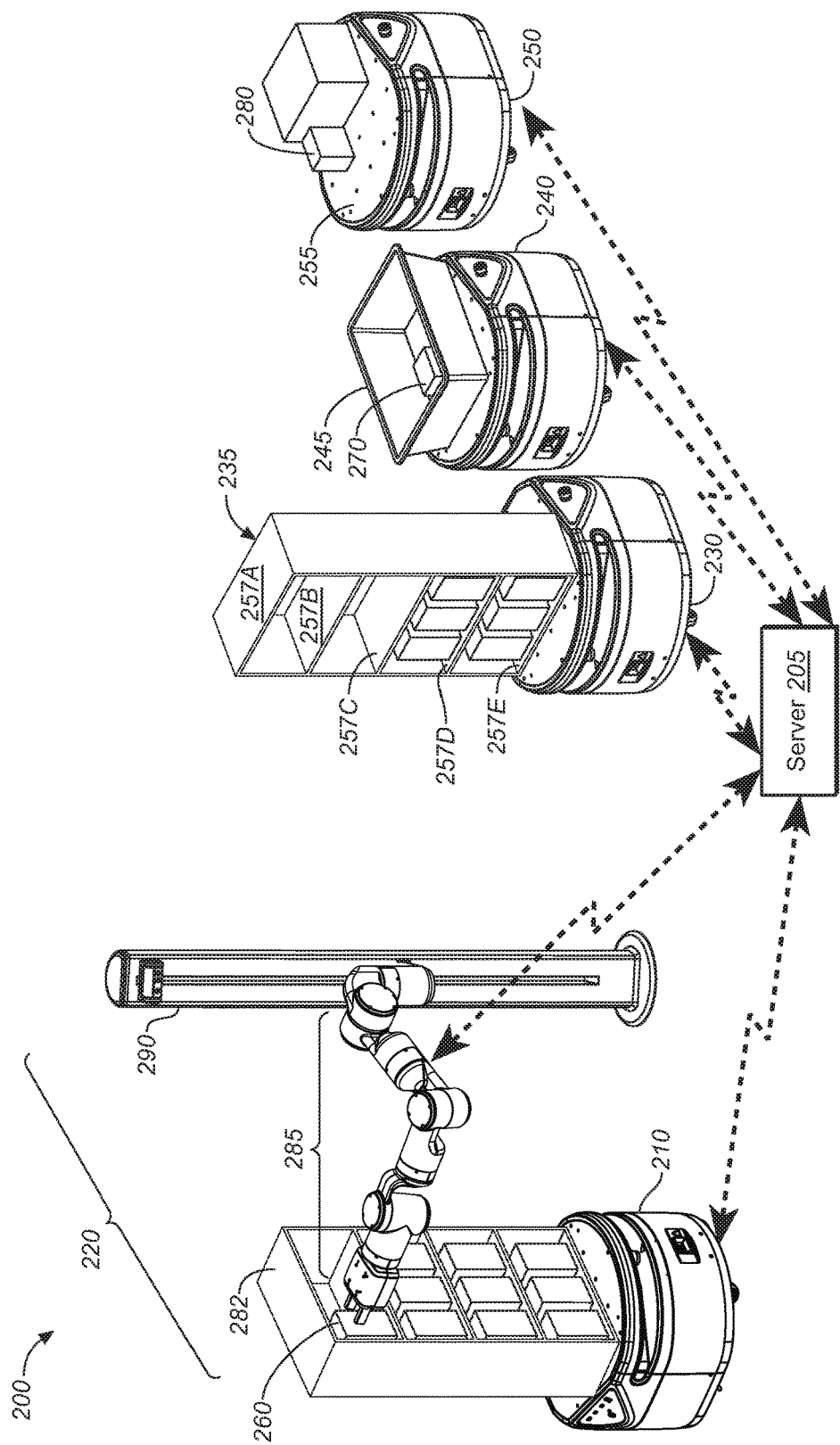

In FIG. 2B, the stationary actor robot 220 positions the first order item 260 so as to be accessible the order robot 210. For example, the stationary actor robot 220 positions the first order item 260 on the order storage 282 comprised in the order robot 210. For example, the stationary actor robot 220 positions the first order item 260 inside the order storage 282 comprised in the order robot 210.

Figure 2C:
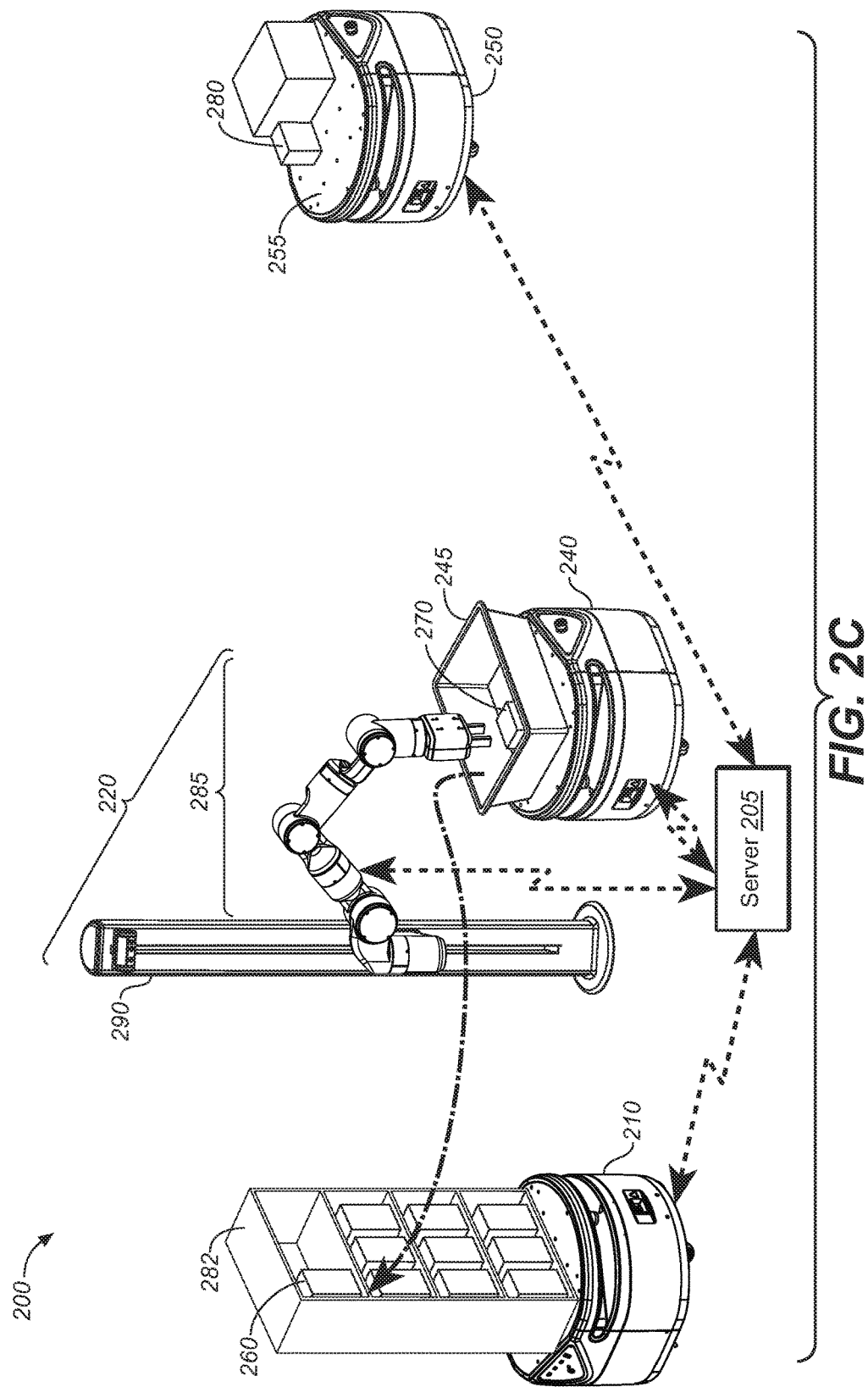

In FIG. 2C, the stationary actor robot 220 picks the second order item 270 in the order from the second inventory storage 245 comprised in the second inventory robot 240.

Figure 2D:
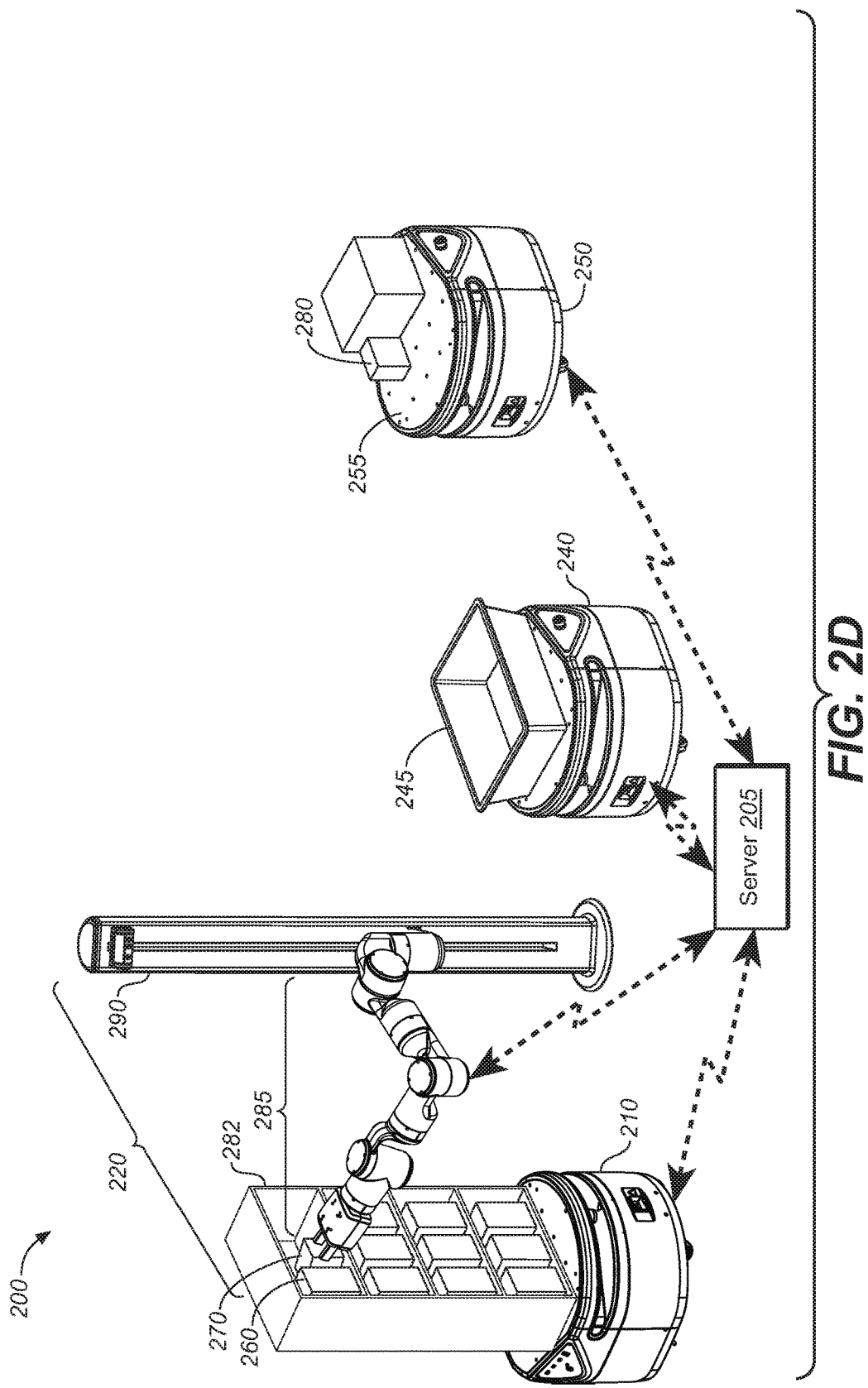

In FIG. 2D, the stationary actor robot 220 positions the second order item 270 so as to be accessible to the order robot 210. For example, the stationary actor robot 220 positions the second order item 270 on the order storage 282 comprised in the order robot 210. For example, the stationary actor robot 220 positions the second order item 270 inside the order storage 282 comprised in the order robot 210.

In FIG. 2E, the stationary actor robot 220 picks the third order item 280 in an order from the third inventory storage 255 comprised in the third inventory robot 250.

Figure 2F:
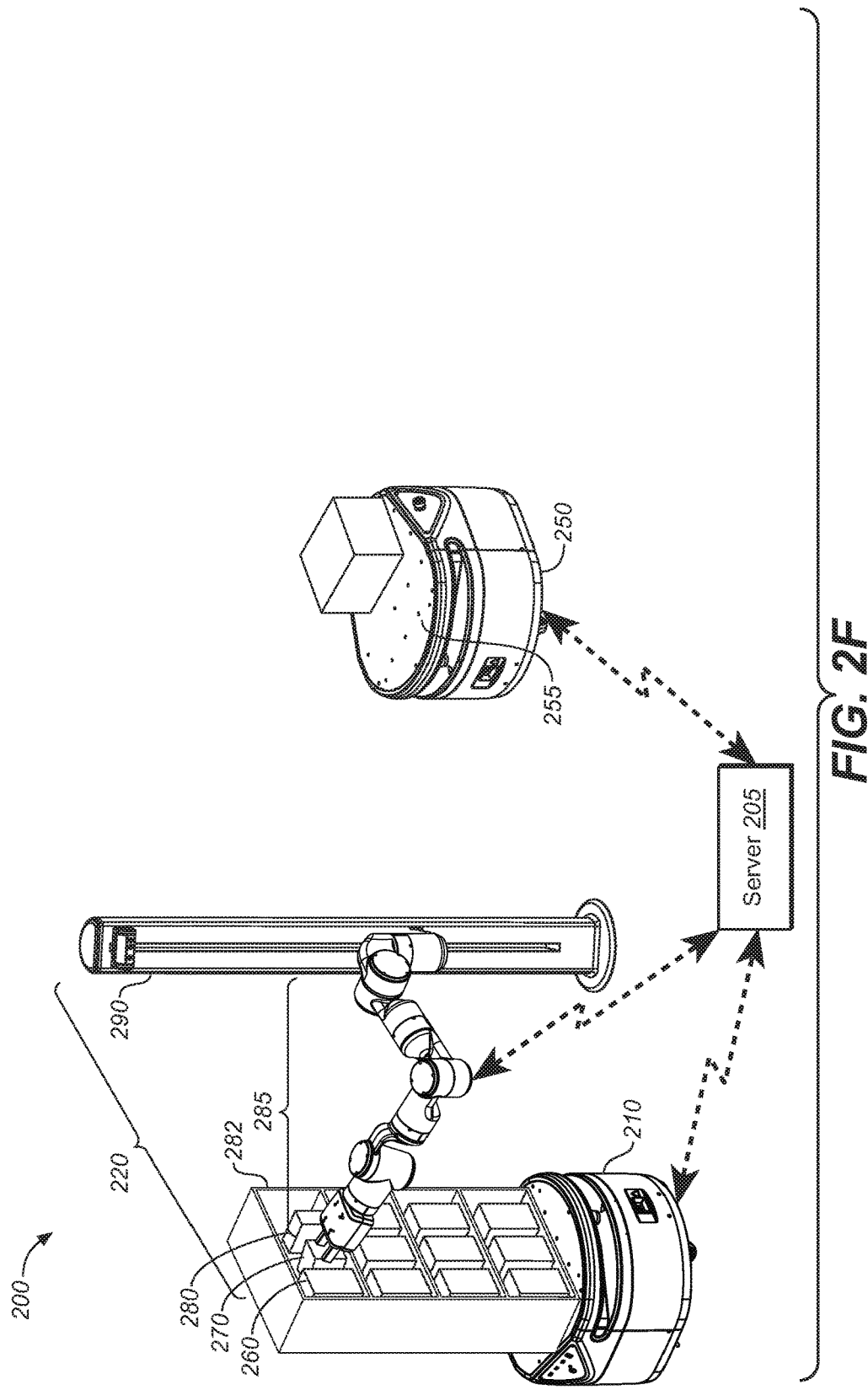

In FIG. 2F, the stationary actor robot 220 positions the third order item 280 so as to be accessible to the order robot 210. For example, the stationary actor robot 220 positions the third item 280 on the order storage 282 comprised in the order robot 210. For example, the stationary actor robot 220 positions the third order item 280 inside the order storage 282 comprised in the order robot 210.

Typically, although not necessarily, the order robot and actor robot stay near each other for more than one loop. For example, inventory robots move from actor robot to actor robot delivering inventory items, which the actor robot then brings to the order robot. For example, the actor robot stays near the inventory storage after the actor robot picks an order item from the inventory storage. For example, after the actor robot picks an order item from the inventory storage, the actor robot picks a second order item from the inventory storage.

For example, a mobile inventory robot moves between at least two actor robots. For example, at least one of the actor robots picks an order item from the mobile inventory robot. For example, the order robot comprising an order item drives itself to a packing station. For example, the order robot positions the order item so as to be accessible to the packer robot. Alternatively, or additionally, the packer robot picks the order item from the order robot. For example, at the packing station, a packer robot packs the order item into a container to be shipped.

For example, the order robot 210 then moves from one stationary actor robot 220 to another stationary actor robot 220, collecting different order items 260, 270, 280. For example, an order may comprise the different order items 260, 270, 280. For example, a first order may comprise some of the different order items, and a second order may comprise the rest of the order items. For example, a first order may comprise first order item 260 and second order item 270, and a second order may comprise third order item 280. For example, the different order items 260, 270, 280 may be distributed across three or more different orders.

FIGS. 3A-3F are a set of pictures that depict a system 300 for order fulfillment using one or more robots. The system 300 again includes the server 205.

As depicted in FIGS. 3A-3F, the stationary actor robot 220 is again operably connected to the server 205. Inventory storage comprises a conveyor 320 that is operably connected with the server 205. The stationary actor robot 220 is positioned at the end of the conveyor 320. For example, the conveyor 320 may comprise one or more of a conveyor belt 320 and another type of conveyor 320. The stationary actor robot 220 picks order items 260, 270, 280 from the conveyor 320. The stationary actor robot 220 positions the picked order items 260, 270, 280 so as to be available to the order robot 210. Alternatively, or additionally, the stationary actor robot 220 positions the picked order items 260, 270, 280 so as to be available to an inventory robot (not pictured).

FIGS. 3A-3F depict the system 300 for order fulfillment using robots as used in a sequence of events in which the stationary actor robot 220 picks ordered inventory 310 comprising the first order item 260, the second order item 270, and the third order item 280, from a conveyor 320 and positions the ordered inventory 310 on the order robot 210. The depicted stationary actor robot 220 again comprises the stationary robot arm 285 mounted on the vertical lift 290 at the inventory storage location 295.

In FIG. 3A, the stationary actor robot 220 picks a first order item 260 in an order from the conveyor 320. Ordered inventory 310 comprises the first order item 260, a second order item 270, and a third order item 280. The depicted stationary actor robot 220 again comprises a stationary robot arm 285 mounted on a vertical lift 290 at a predetermined pick location.

Alternatively, or additionally, inventory storage (not shown) may be positioned so as to be available to the stationary actor robot 220 so that it may be used for temporary storage of the ordered inventory 310. For example, the inventory storage may comprise one or more of one or more of an inventory robot, a box, a bin, a fixed shelf, a non-fixed shelf, a rack, and other inventory storage. FIGS. 6A-6B and 7A-7D provide more detail regarding inventory storage.

Figure 3B:
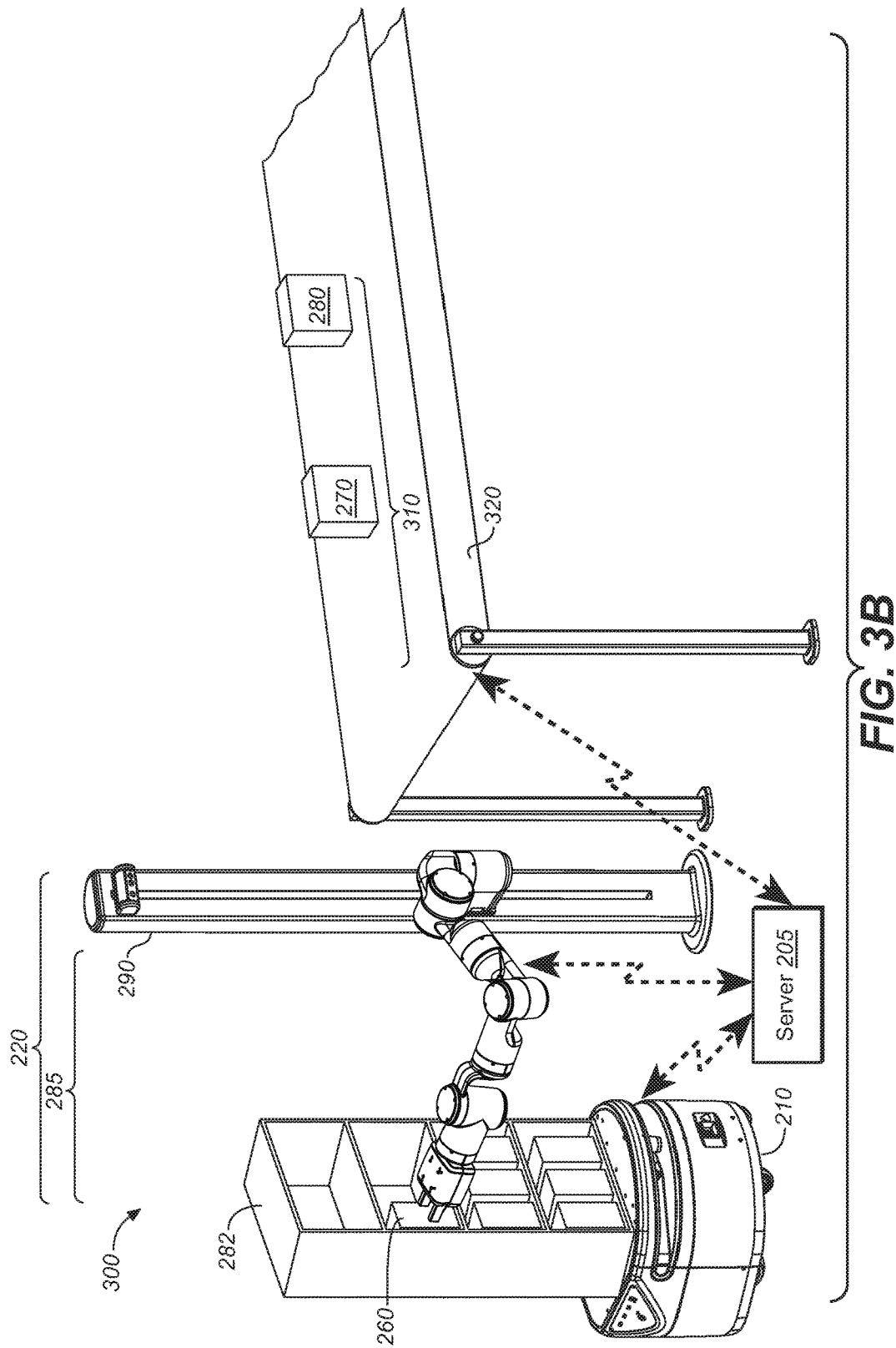

In FIG. 3B, the stationary actor robot 220 positions the first order item 260 so as to be accessible the order robot 210. For example, the stationary actor robot 220 positions the first order item 260 on the order robot 210. For example, the stationary actor robot 220 positions the first order item 260 inside the order robot 210.

Figure 3C:
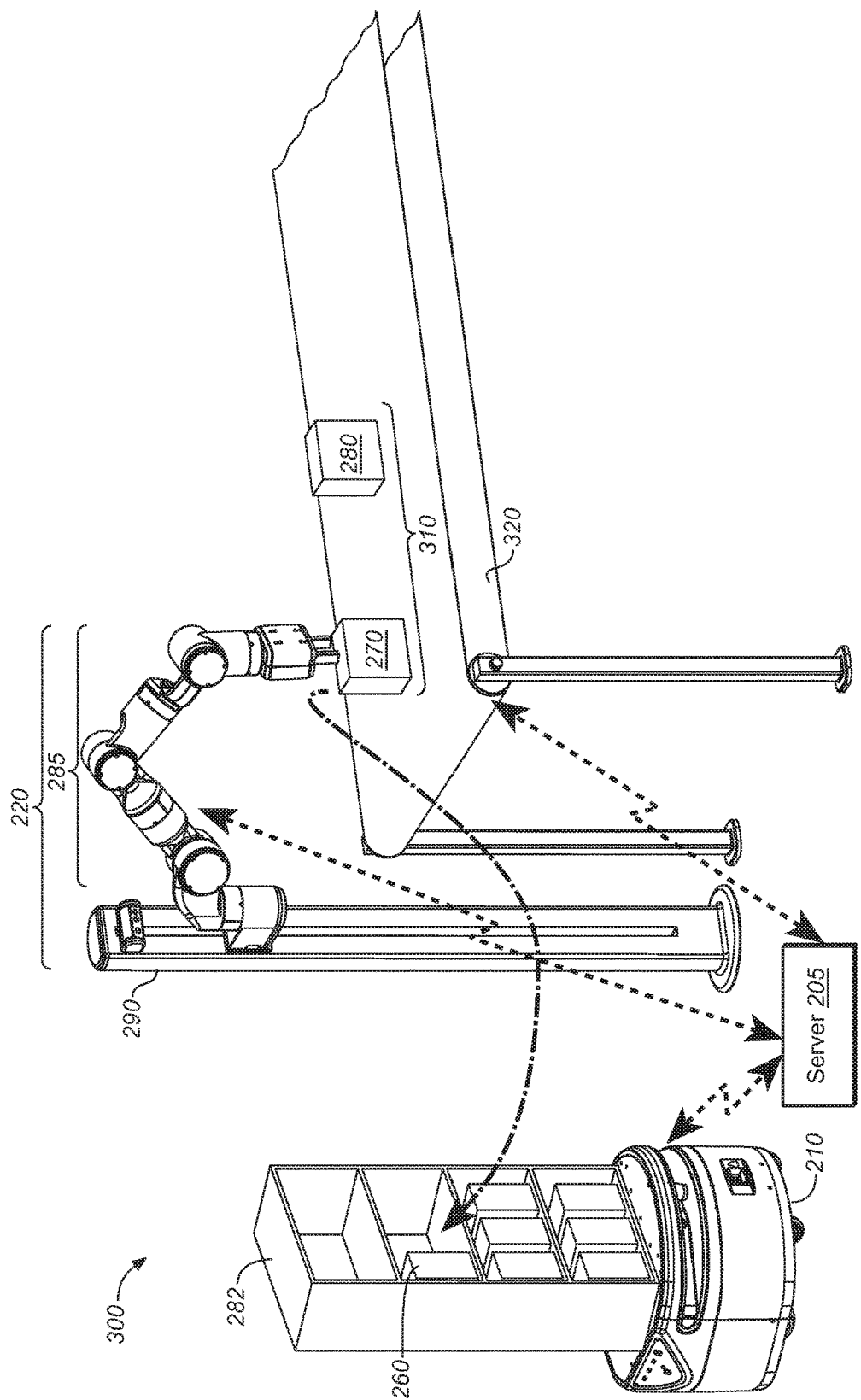

In FIG. 3C, the stationary actor robot 220 picks a second order item 270 in the order from the conveyor 320.

Figure 3D:
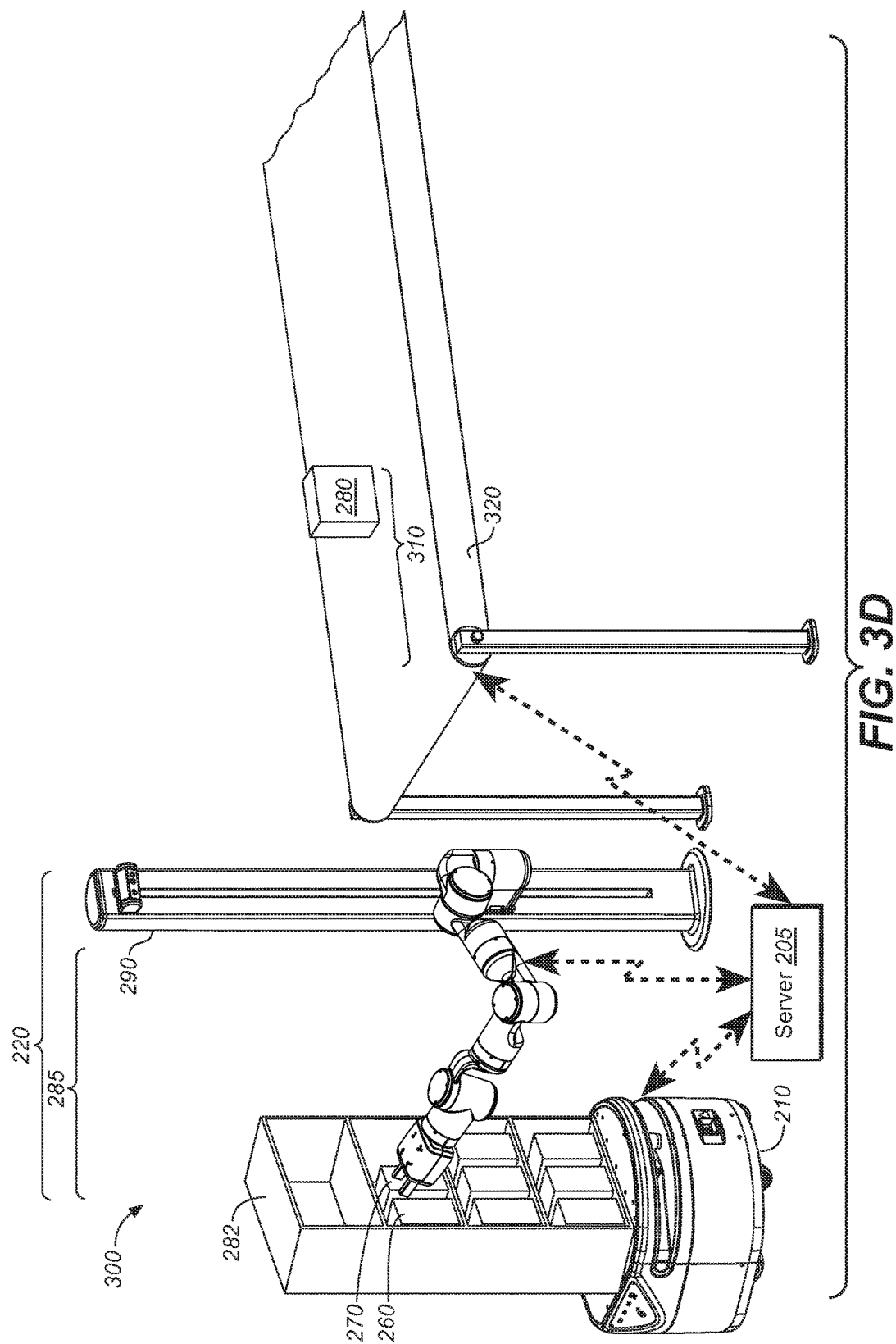

In FIG. 3D, the stationary actor robot 220 positions the second order item 270 so as to be accessible to the order robot 210. For example, the stationary actor robot 220 positions the second order item 270 on the order robot 210. For example, the stationary actor robot 220 positions the second order item 270 inside the order robot 210.

In FIG. 3E, the stationary actor robot 220 picks a third order item 280 in the order from the third inventory robot 250.

Figure 3F:
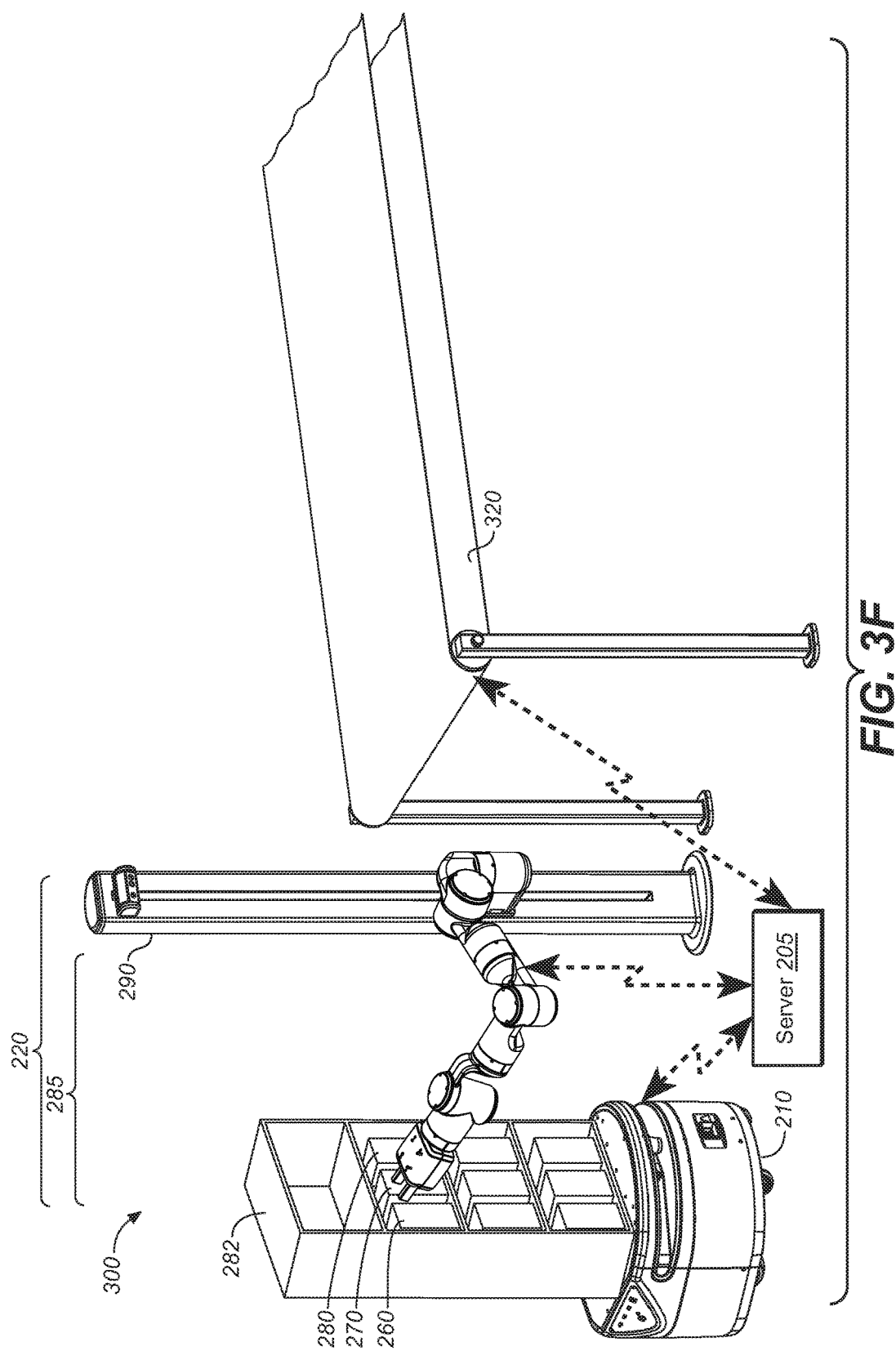

In FIG. 3F, the stationary actor robot 220 positions the third order item 280 so as to be accessible to the order robot 210. For example, the stationary actor robot 220 positions the third order item 280 on the order robot 210. For example, the stationary actor robot 220 positions the third order item 280 inside the order robot 210.

Figure 4A:
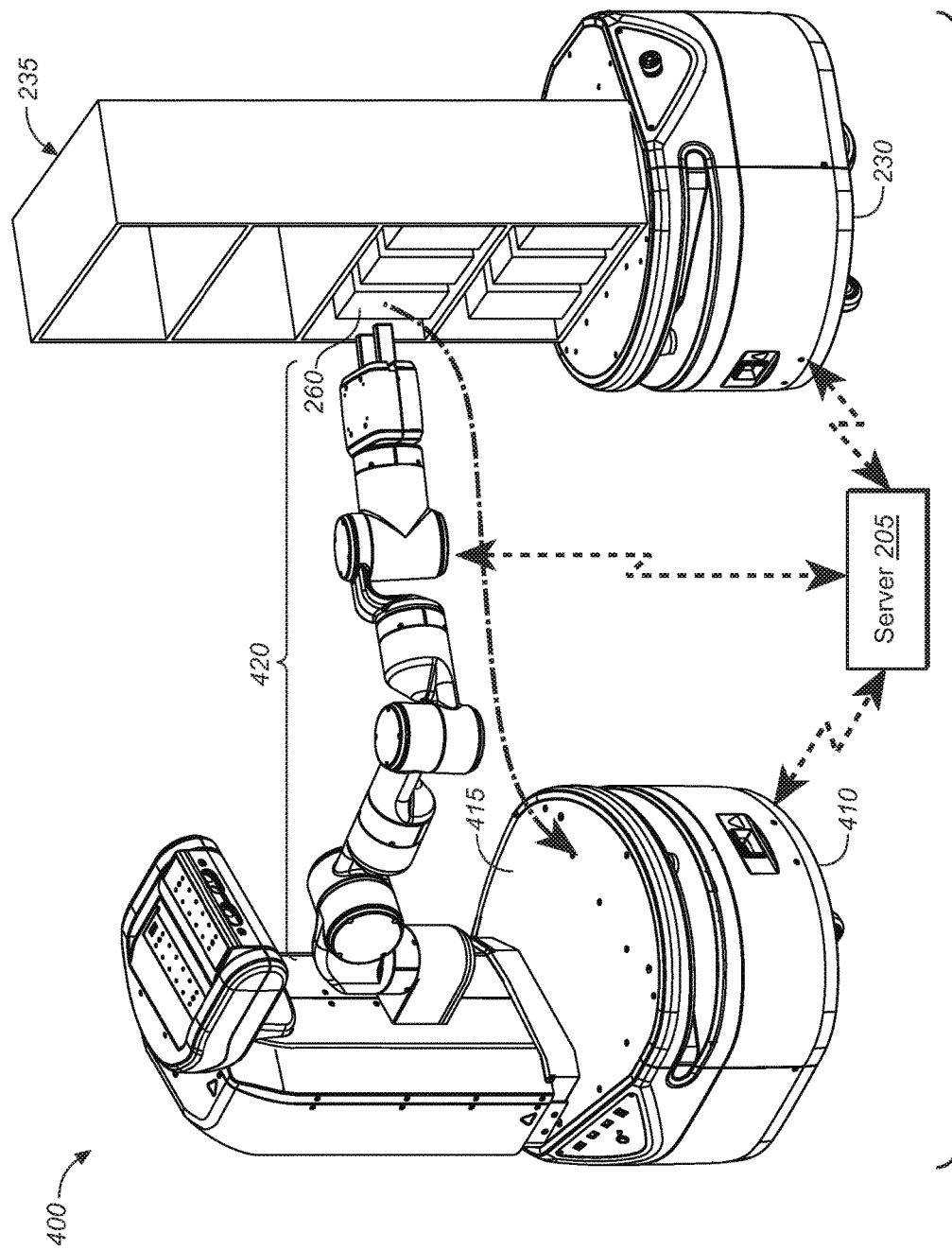
FIGS. 4A-4B are a set of pictures that depict a system for order fulfillment using one or more robots, as used in a sequence of events in which the mobile actor robot that is also the mobile order robot picks an order item from an inventory robot and positions the order item so as to be accessible to the mobile order robot.
Figure 4B:
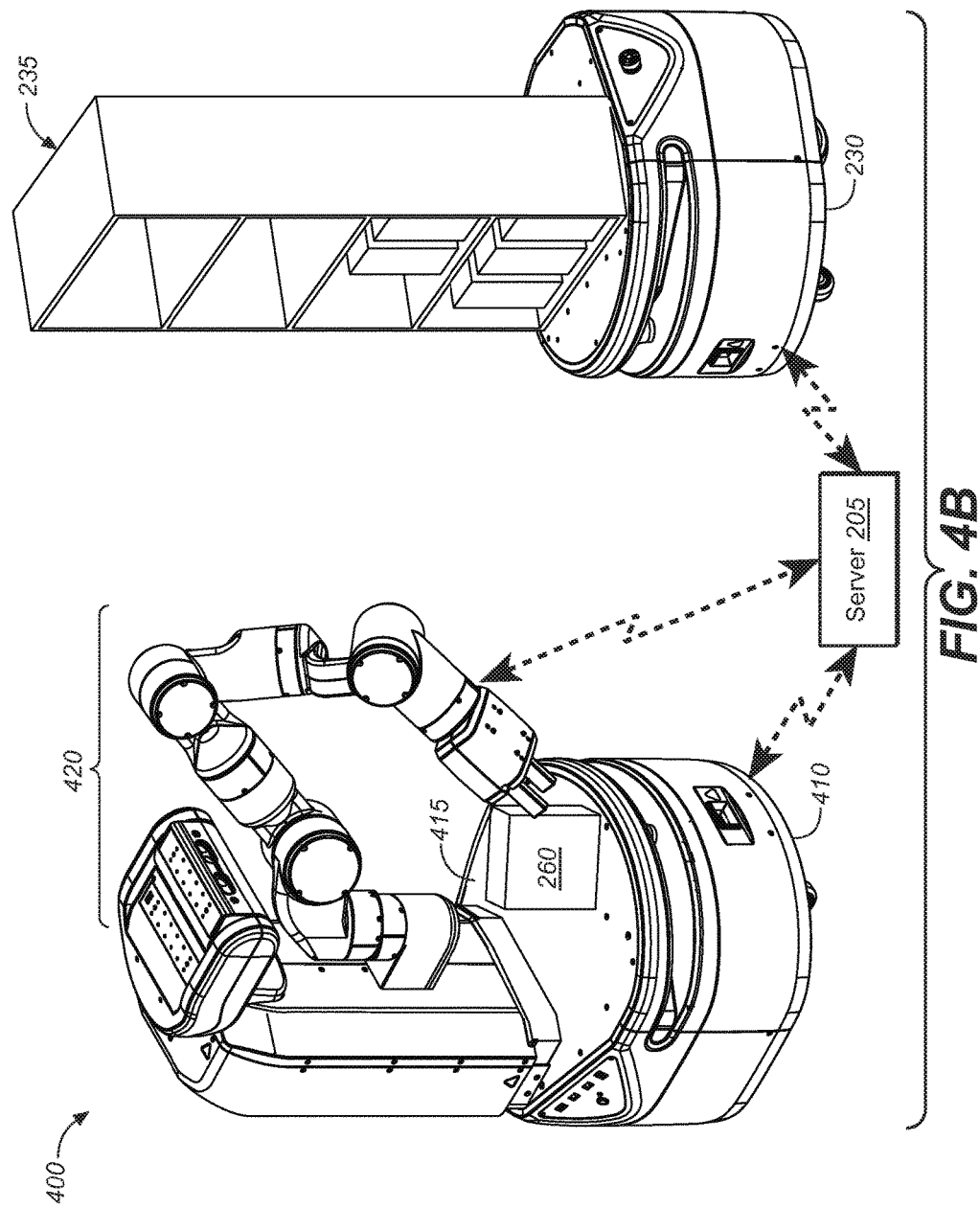

FIGS. 4A-4B are a set of pictures that depict a system 400 for order fulfillment using one or more robots. The system again includes the server 205. The first inventory robot 230 again comprises inventory storage 235. As shown, the inventory storage 235 comprises one or more inventory shelves 235.

FIGS. 4A-4B depict the system 400 for order fulfillment using robots as used in a sequence of events in which a mobile actor robot 410 that is also the mobile order robot 410 picks the first order item 260 from the first inventory storage 235 comprised in the first inventory robot 230 and positions the first order item 260 so as to be accessible to the mobile order robot 410. The mobile actor robot 410 comprises actor storage 415. As shown, the actor storage 415 comprises actor shelves 415.

For example, one or more mobile actor robots 410 may meet at a pick location in an inventory storage location where one or more order items 260, 270, 280 is picked by one or more of the one or more mobile actor robots 410. For example, the one or more order items 260, 270, 280 may be transferred between a robot and inventory storage. For example, the inventory may be transferred to one or more of a robot and inventory storage. An order may thereby be filled.

In FIG. 4A, the mobile actor robot 410, using a mobile actor robot arm 420, picks the first order item 260 in an order from the inventory robot 230.

In FIG. 4B, the mobile actor robot 410, using the mobile actor robot arm 420, positions the first order item 260 so as to be accessible to the mobile actor robot 410. Here the mobile actor robot 410 also effectively acts as the order robot. For example, the mobile actor robot 410 positions the first order item 260 on the actor storage 415 comprised in the mobile actor robot 410. For example, the mobile actor robot 410 positions the first order item 260 inside the actor storage 415 comprised in the mobile actor robot 410. The order storage 415 comprises one or more actor shelves 415.

Figure 5A:
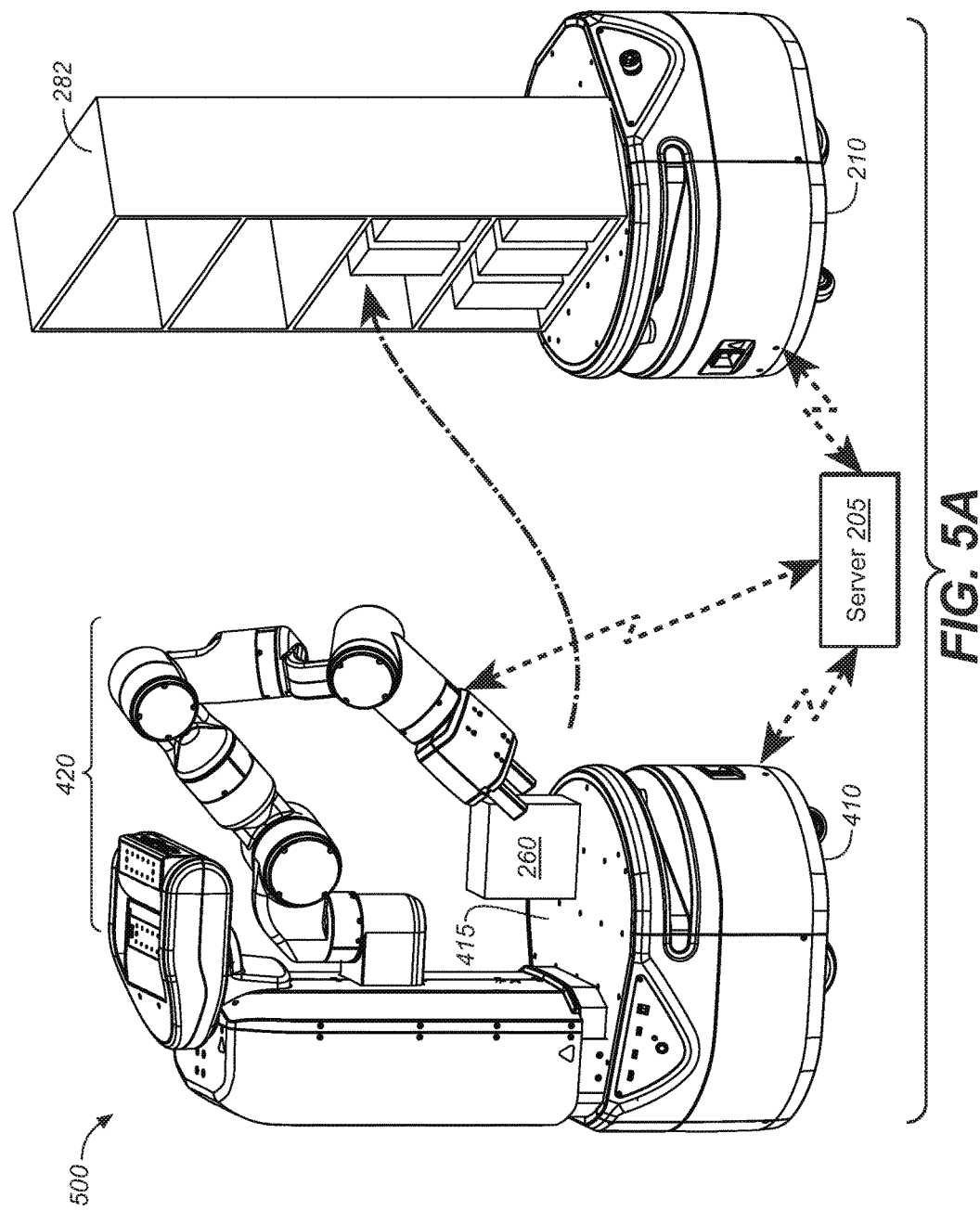
FIGS. 5A-5B are a set of pictures that depict a system for order fulfillment using one or more robots, as used in a sequence of events in which the mobile actor robot that is also effectively the inventory robot picks an order item from the mobile actor robot and positions the order item so as to be accessible to the order robot.
Figure 5B:
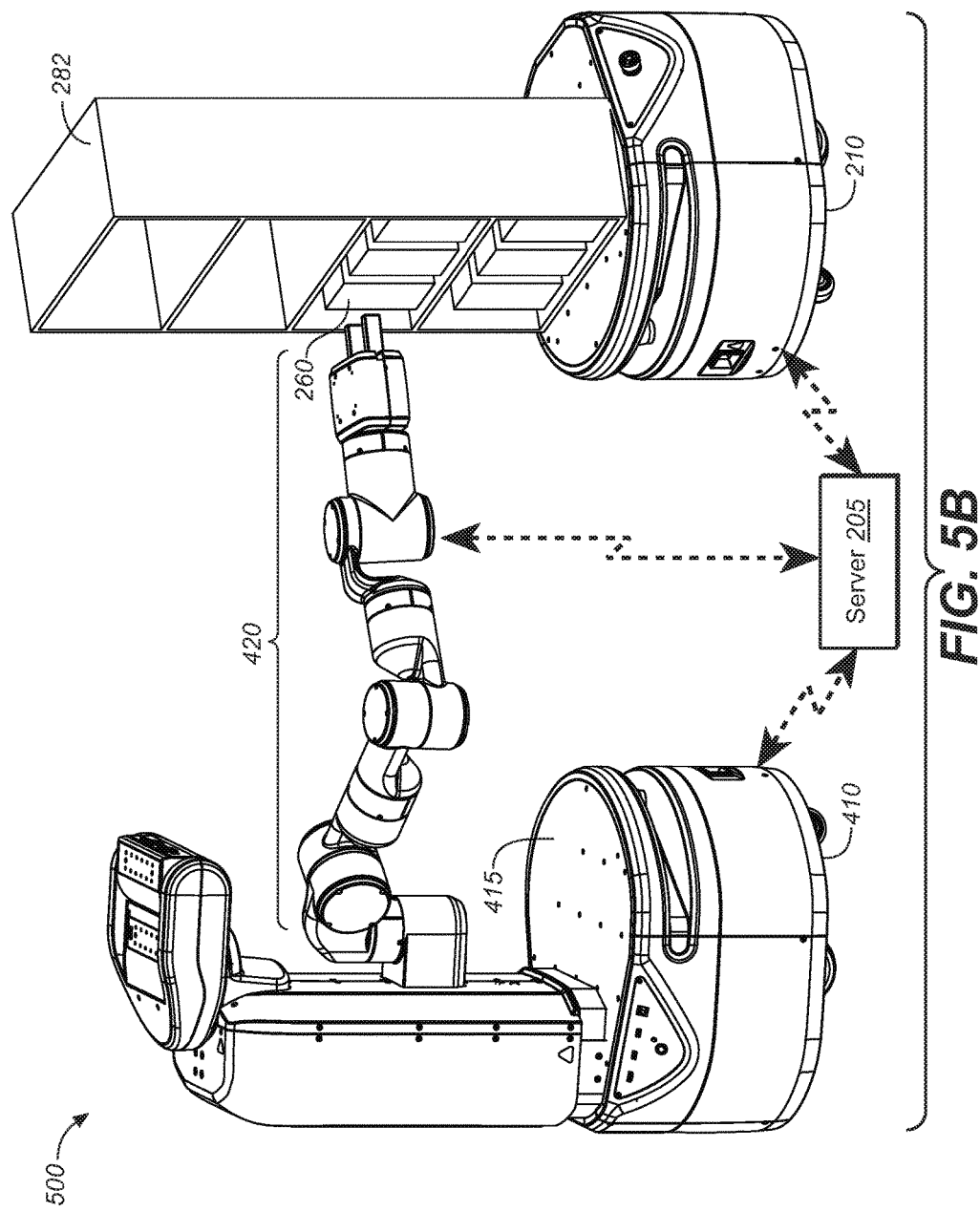

FIGS. 5A-5B are a set of pictures that depict a system 500 for order fulfillment using one or more robots. The system again includes the server 205.

FIGS. 5A-5B depict the system 500 for order fulfillment using robots as used in a sequence of events in which a mobile actor robot 410 that is also effectively the inventory robot picks the first order item 260 from the mobile actor robot 410 and positions the first order item 260 so as to be accessible to the order robot 210. The order robot 210 comprises order storage 282. The mobile actor robot 410 comprises actor storage 415. As shown, the actor storage 415 comprises actor shelves 415.

In FIG. 5A, the mobile actor robot 410 picks the first order item 260 in an order from the mobile actor robot 410.

In FIG. 5B, the mobile actor robot 410 positions the first order item 260 so as to be accessible to the order robot 210. Here the mobile actor robot 410 also effectively acts as an inventory robot. For example, the mobile actor robot 410 positions the first order item 260 on the order storage 282 comprised in the order robot 210. For example, the mobile actor robot 410 positions the first order item 260 inside the order storage 282 comprised in the order robot 210.

Figure 6A:
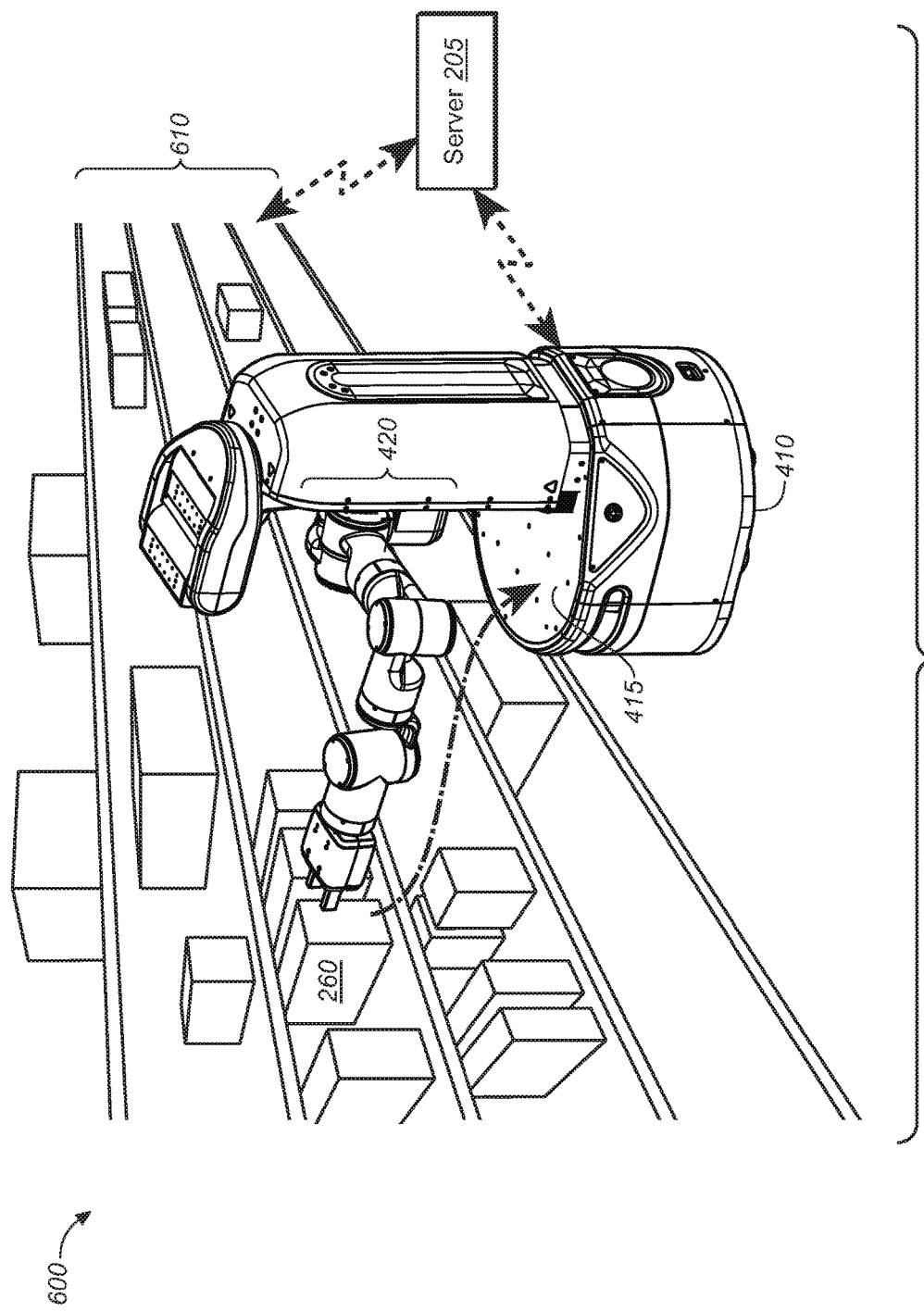

FIGS. 6A-6B are a set of pictures that depict a system 600 for order fulfillment using one or more robots. The system again includes the server 205.

FIGS. 6A-6B depict the system 600 for order fulfillment using robots as used in a sequence of events in which a mobile actor robot 410 that is also the mobile order robot 410 picks the first order item 260 from inventory storage 610 and positions the first order item 260 so as to be accessible to the mobile order robot 410. The mobile actor robot 410 again comprises actor storage 415.

The inventory storage 610 may be positioned so as to be available to the mobile actor robot 410 so that it may be used for temporary storage of the ordered inventory 310. For example, the inventory storage 610 may comprise one or more of an inventory robot 610, a box 610, a bin 610, a fixed shelf 610, a non-fixed shelf 610, a rack 610, and other inventory storage 610. As depicted, the inventory storage 610 comprises the fixed shelf 610.

In FIG. 6A, the mobile actor robot 410, using a mobile actor robot arm 420, picks the first order item 260 in an order from the inventory storage 610.

In FIG. 6B, the mobile actor robot 410, using the mobile actor robot arm 420, positions the first order item 260 so as to be accessible to the mobile actor robot 410. Here the mobile actor robot 410 also effectively acts as the order robot. For example, the mobile actor robot 410 positions the first order item 260 on the actor storage 415 comprised in the mobile actor robot 410. For example, the mobile actor robot 410 positions the first order item 260 inside the actor storage 415 comprised in the mobile actor robot 410.

FIGS. 7A-7D are a set of pictures that depict a system 700 for order fulfillment using one or more robots. The system again includes the server 205.

FIGS. 7A-7D depict the system 700 for order fulfillment using robots as used in a sequence of events in which the mobile actor robot 410 picks the first order item 260 from a first inventory storage 710 and positions the first order item 260 so as to be accessible to the order robot 210, then picks the second order item 270 from a second inventory storage 720 and positions the second order item 270 so as to be accessible to the order robot 210. Alternatively, or additionally, multiple actor robots may be involved in the process, so that a first order robot receives the first order item 260 and a second order robot receives the second order item 270. The order robot 210 again comprises order storage 282.

In FIG. 7A, the mobile actor robot 410, using a mobile actor robot arm 420, picks the first order item 260 in an order from the first inventory storage 710.

Figure 7B:
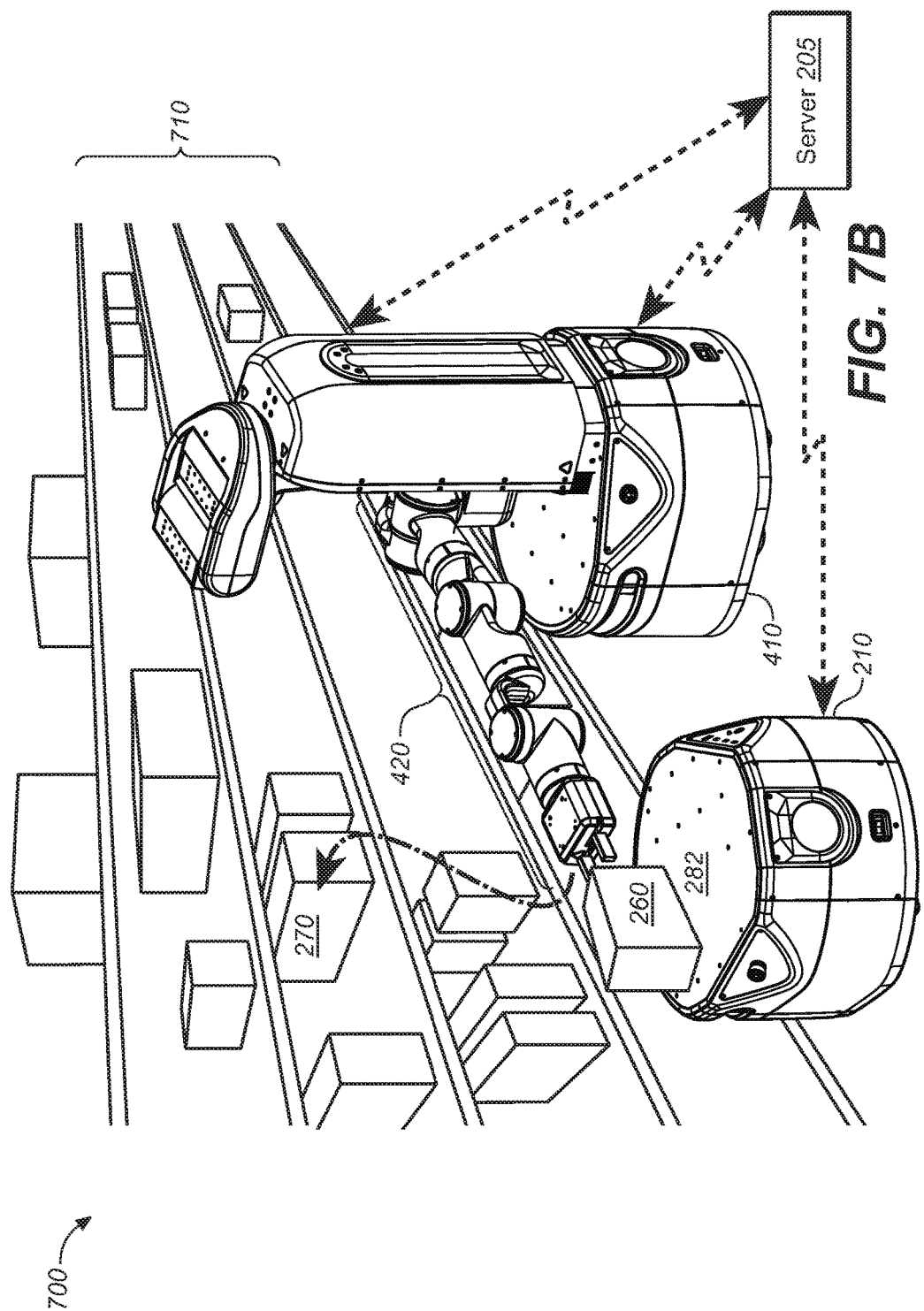

In FIG. 7B, the mobile actor robot 410, using the mobile actor robot arm 420, positions the first order item 260 so as to be accessible to the order robot 210. For example, the mobile actor robot 410 positions the first order item 260 on the order robot 210. For example, the mobile actor robot 410 positions the first order item 260 on the order storage 282 that is comprised in the order robot 210.

For example, the order robot may then move from one stationary actor robot to another stationary actor robot, collecting different order items. For example, an order may comprise the different order items. For example, a first order may comprise some of the different order items and a second order may comprise the rest of the order items. For example, the different order items may be distributed across three or more different orders.

In FIG. 7C, the mobile actor robot 410 picks the second order item 270 in an order from the second inventory storage 720.

In FIG. 7D, the mobile actor robot 410 positions the second order item 270 so as to be accessible to the order robot 210. For example, the mobile actor robot 410 positions the second order item 270 on the order robot 210. For example, the mobile actor robot 410 positions the second order item 270 on the order storage 282 that is comprised in the order robot 210.

FIGS. 8A-8F are a set of pictures that depict an order robot that is loaded with picked order items driving itself to a packing station pursuant to a system for order fulfillment using one or more robots, where a packer robot packs one or more of the order items into boxes to be shipped.

Figure 8A:
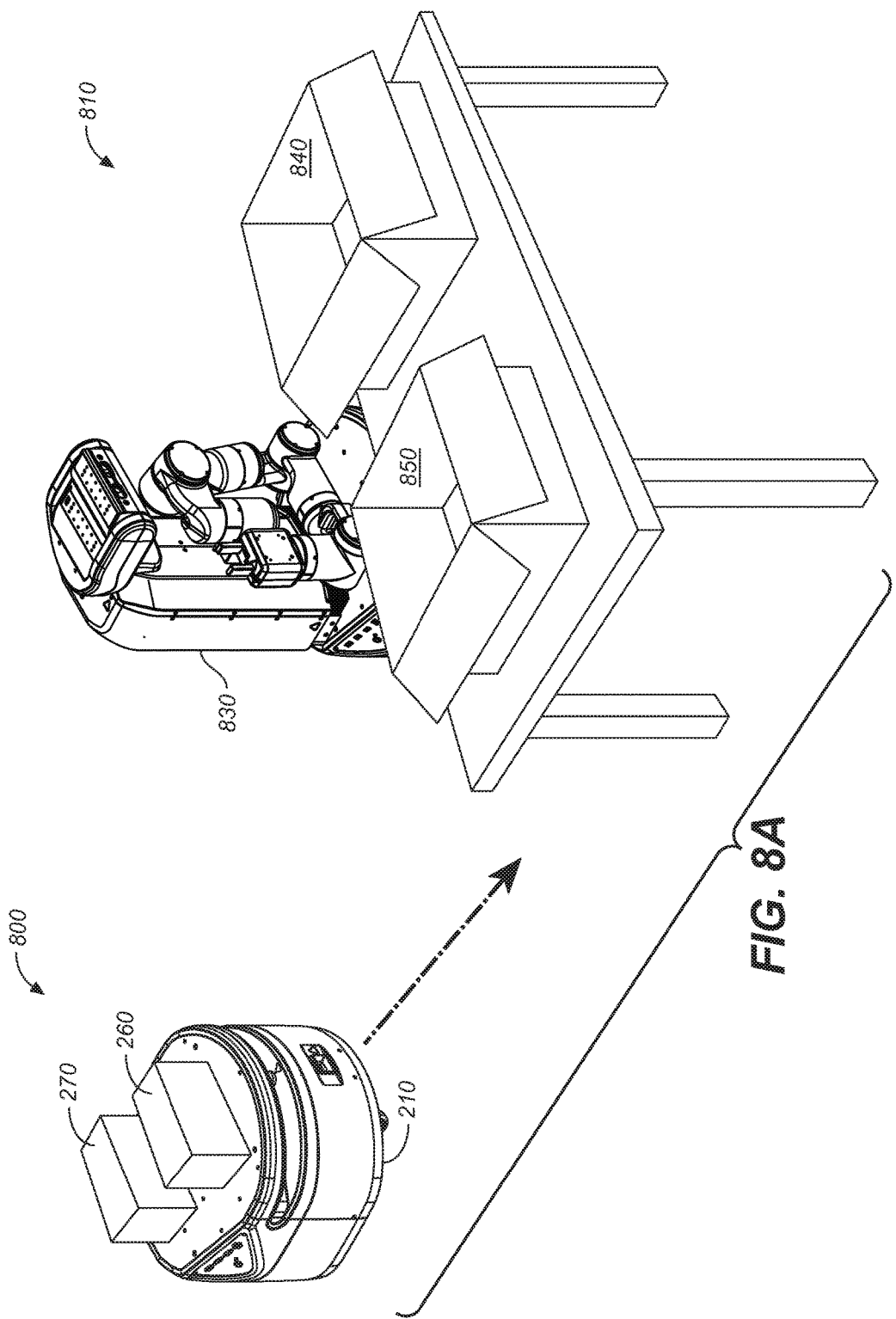
FIGS. 8A-8F are a set of pictures that depict an order robot that is loaded with picked order items driving itself to a packing station pursuant to a system for order fulfillment using one or more robots, where a packer robot packs the picked order items into boxes to be shipped.

In FIG. 8A, the order robot 210 comprising one or more picked order items drives from a pick location 800 to a packing station 810. For example, as pictured, the order robot 210 comprising the first order item 260 and the second order item 270 drives from the pick location 800 to the packing station 810.

Figure 8B:
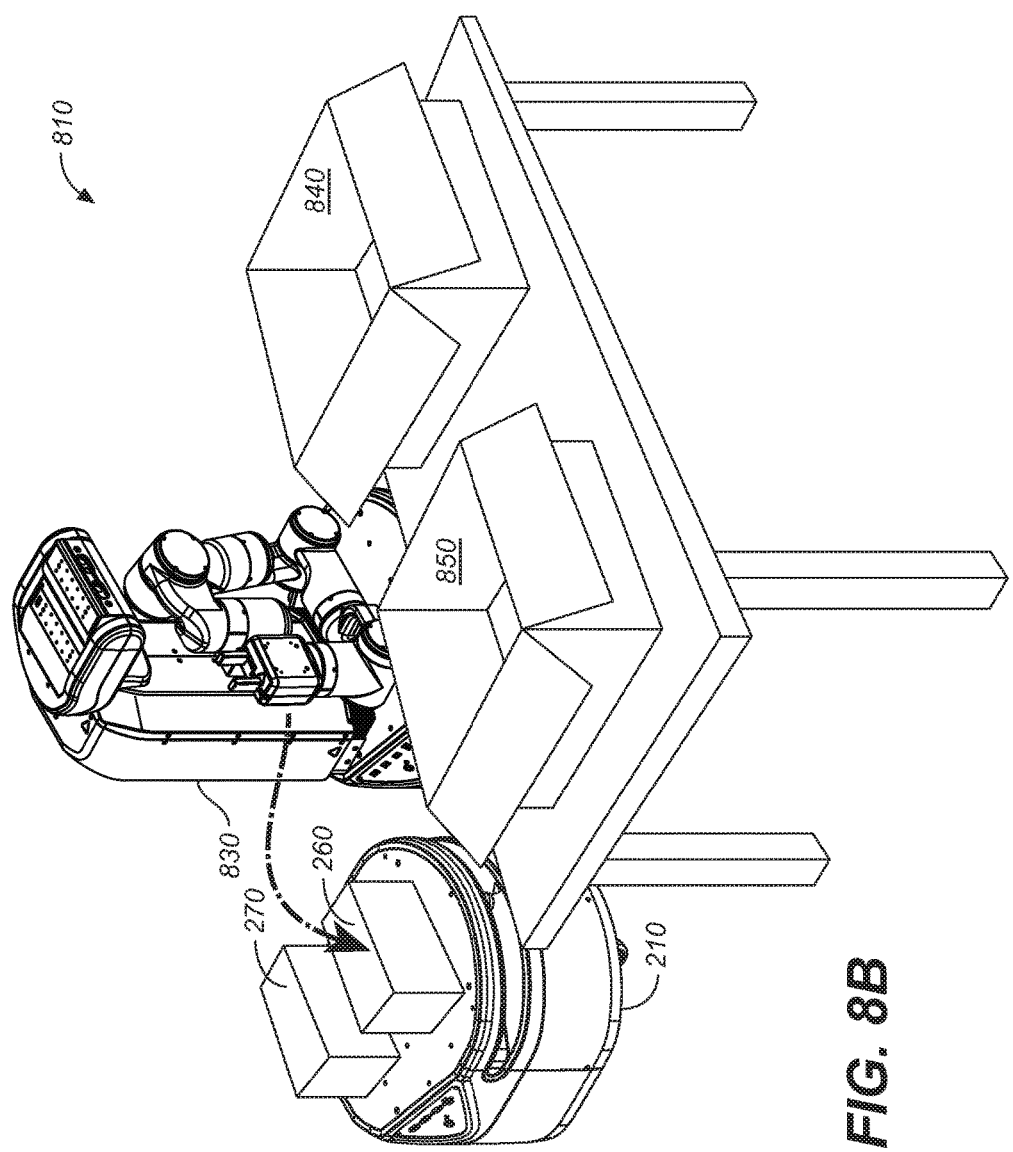

In FIG. 8B, the order robot 210 comprising the first order item 260 and the second order item 270 arrives at the packing station 810.

Figure 8C:
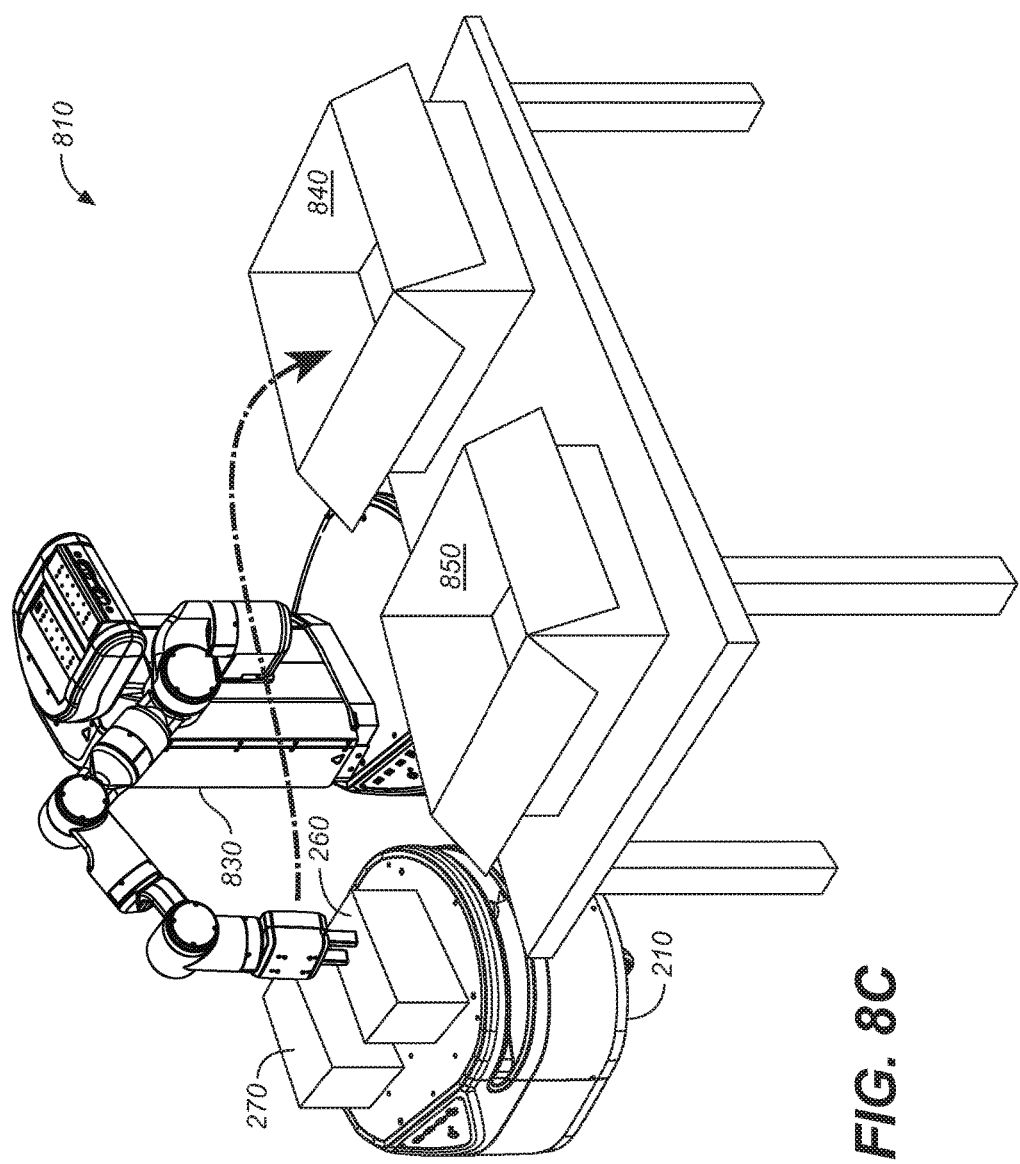

In FIG. 8C, the order robot 210 positions the first order item 260 so as to be accessible to a packer robot 830. Alternatively, or additionally, the packer robot 830 picks the first order item 260 from the order robot 210.

Figure 8D:
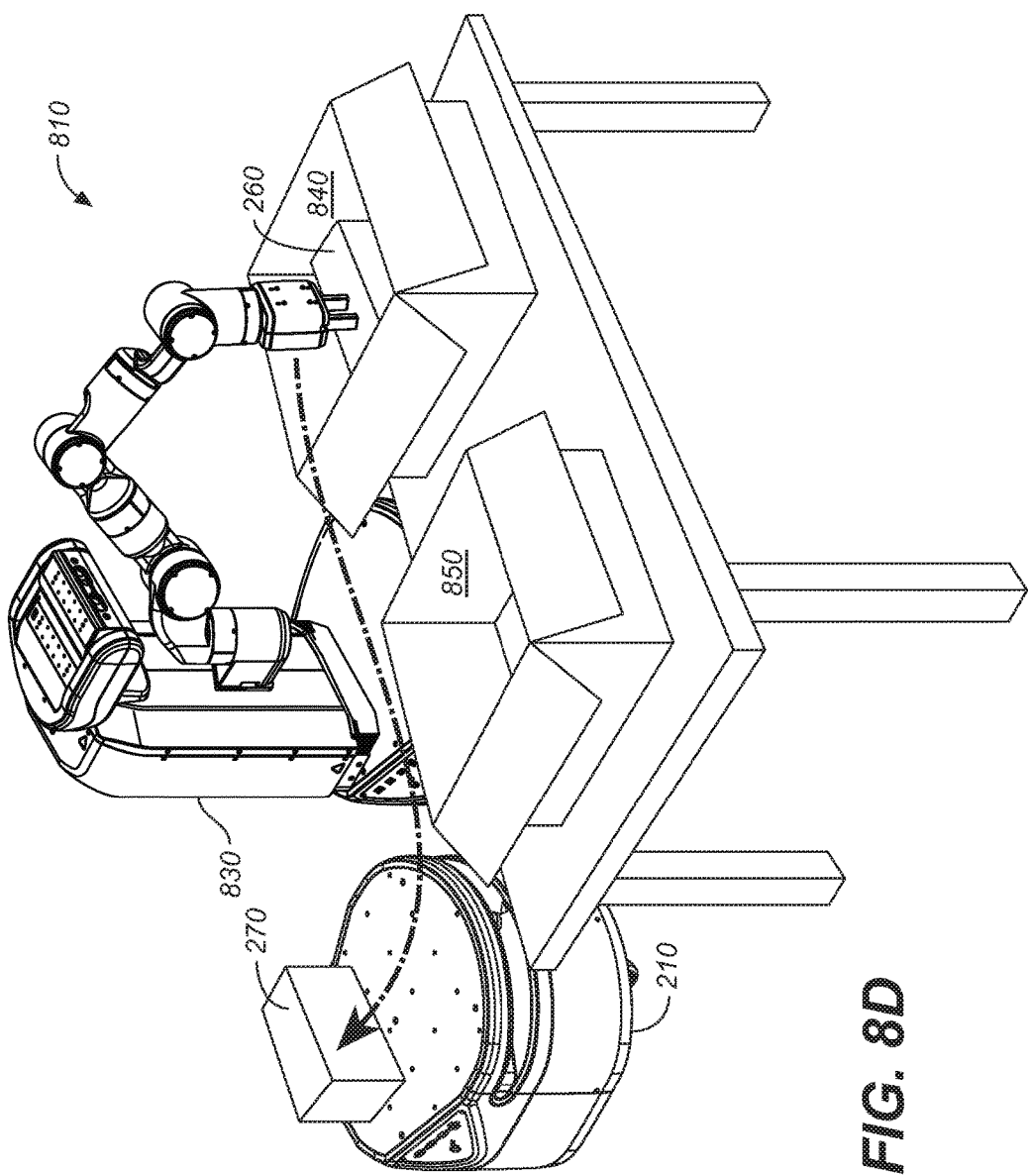

In FIG. 8D, the packer robot 830 packs the first order item 260 in a first box 840.

Figure 8E:
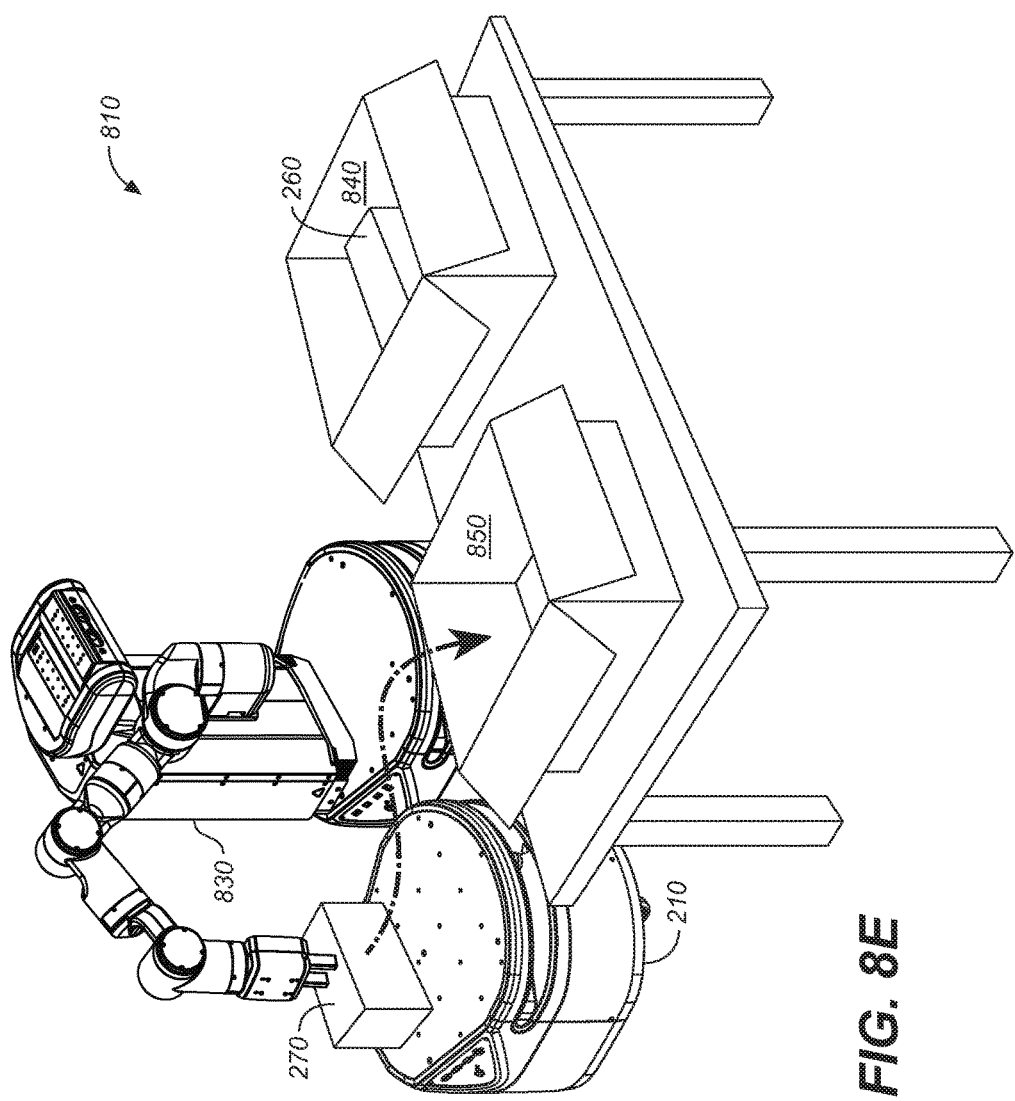

In FIG. 8E, the order robot 210 positions the second order item 270 so as to be accessible to a packer robot 830. Alternatively, or additionally, the packer robot 830 picks the second order item 270 from the order robot 210. Alternatively, or additionally, the packer robot 830 that picks the first order item 260 from the order robot 210 can be a first packer robot and the packer robot 830 that picks the second order item 270 from the order robot 210 can be a second packer robot. Commonly, but not necessarily, the first box 840 and the second box 850 will be the same box. Alternatively, or additionally, the packer robot 830 packs the second order item 270 before packing the first order item 260. That is, the packer robot 830 is not bound to follow the same sequence used during the picking process.

Figure 8F:
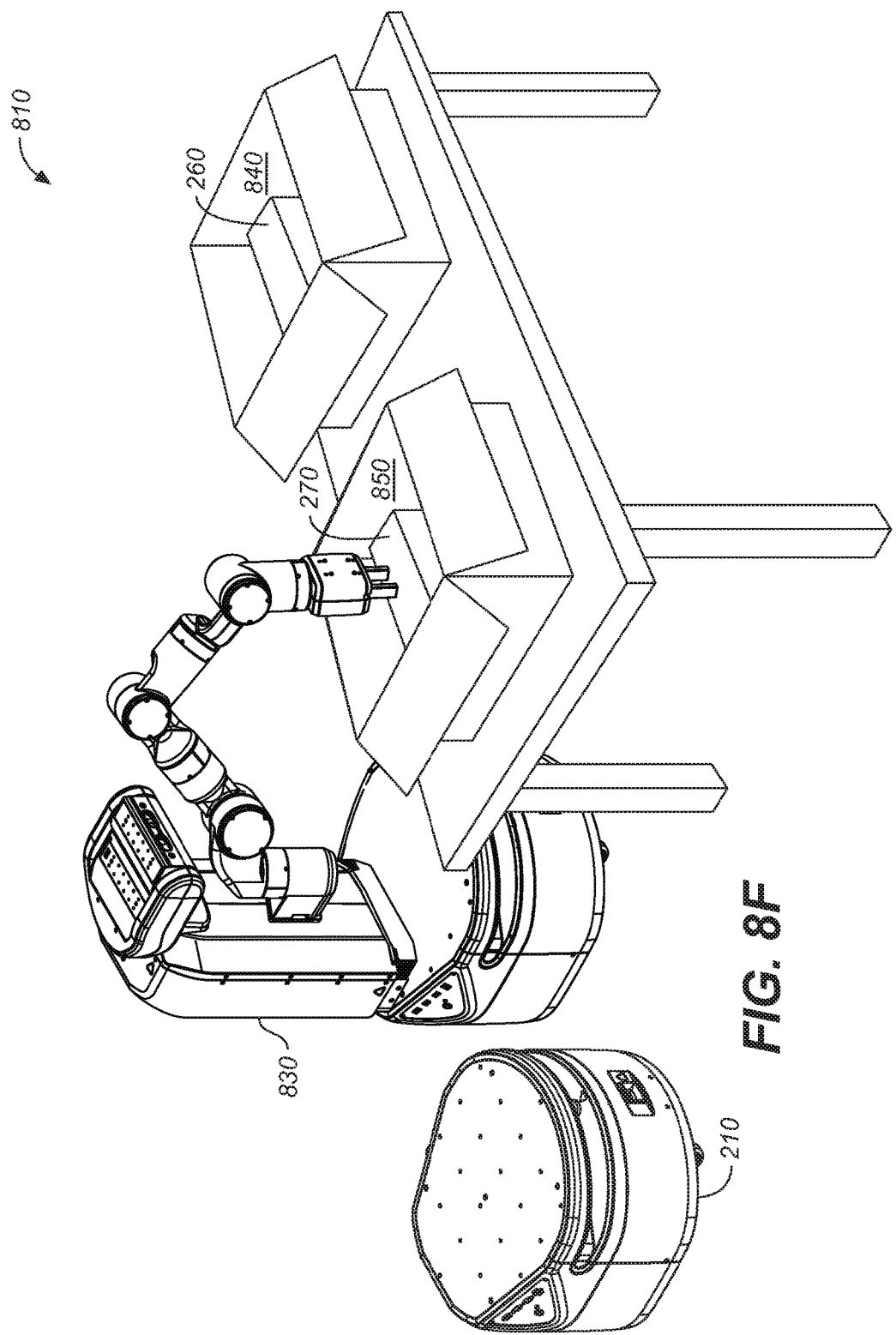

In FIG. 8F, the packer robot 830 packs the second order item 270 in a second box 850.

Figure 9:
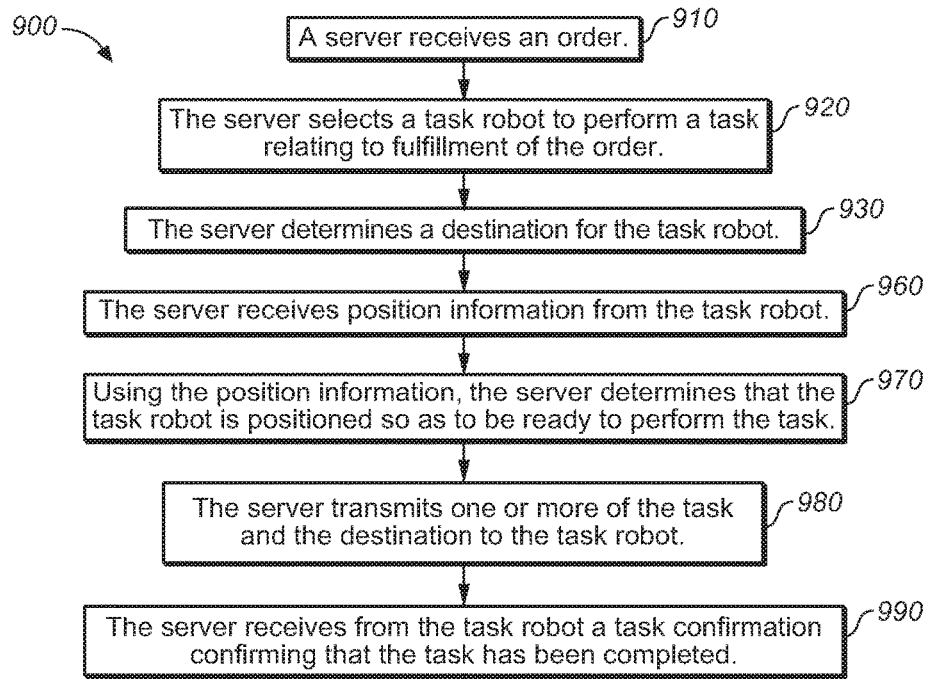
FIG. 9 is a flowchart of a method for order fulfillment using robots.

FIG. 9 is a flowchart of a method 900 for order fulfillment using robots. The order of the steps in the method 900 is not constrained to that shown in FIG. 9 or described in the following discussion. Several of the steps could occur in a different order without affecting the final result.

In step 910, a server receives an order. For example, the order comprises one or more items. For example, the order comprises an inventory management job. For example, the server receives the order from a customer. For example, the server receives the order from an inventory manager. Block 910 then transfers control to block 920.

In step 920, the server selects a task robot to perform a task relating to fulfillment of the order. Block 920 then transfers control to block 930.

In step 930, the server determines a destination for the task robot. The destination is determined so as to enable the task robot to perform its task. Block 930 then transfers control to block 960.

In step 960, the server receives position information from the task robot. Block 960 then transfers control to block 970.

In step 970, using the position information, the server determines that the task robot is positioned so as to be ready to perform the task. Block 970 then transfers control to block 980.

In block 980, the server transmits one or more of the task and the destination to the task robot. Block 980 then transfers control to block 990.

In step 990, the server receives from the task robot, a task confirmation confirming that the task has been completed. Block 990 then terminates the process.

Additional optional steps may be performed after step 920. The server may compute a currently planned path for the task robot configured to enable the task robot to reach the destination while optimizing criteria of interest. Then the server may transmit the currently planned path to the task robot. Alternatively, the task robot determines the currently planned path itself without recourse to the server for generation of the currently planned path.

Figure 10:
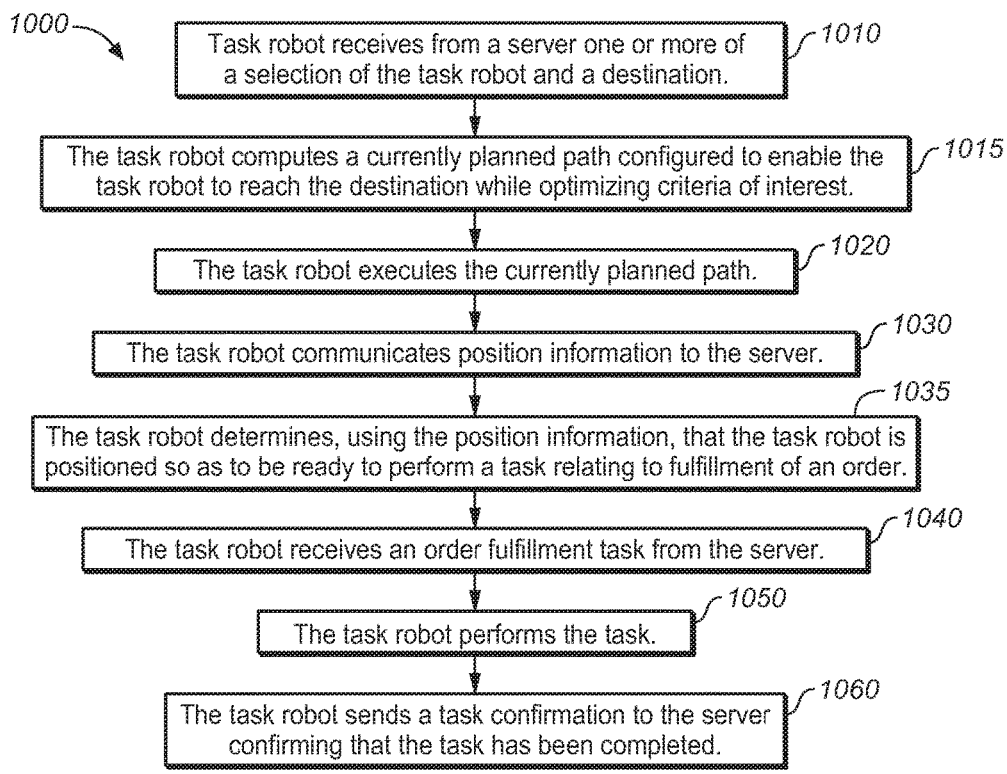
FIG. 10 is a flowchart of a method for order fulfillment using robots.

FIG. 10 is a flowchart of a method 1000 for order fulfillment using robots. The order of the steps in the method 1000 is not constrained to that shown in FIG. 10 or described in the following discussion. Several of the steps could occur in a different order without affecting the final result.

In step 1010, a task robot receives from a server one or more of a selection of the task robot and a destination. The task robot again comprises one or more of an inventory robot, an order robot, an actor robot, and a packer robot. Block 1010 then transfers control to block 1015.

In step 1015, the task robot computes a currently planned path configured to enable the task robot to reach the destination while optimizing criteria of interest. Block 1015 then transfers control to block 1020.

In step 1020, the task robot executes the currently planned path. Block 1020 then transfers control to block 1030.

In step 1030, the task robot communicates position information to the server. Block 1030 then transfers control to block 1040.

In step 1035, the task robot determines, using the position information, that the task robot is positioned so as to be ready to perform a task relating to fulfillment of an order.

In step 1040, the task robot receives the task from the server. Block 1040 then transfers control to block 1050.

In step 1050, the task robot performs the task. Block 1050 then transfers control to block 1060.

In step 1060, the task robot sends a task confirmation confirming that the task has been completed. Block 1060 then terminates the process.

According to additional embodiments of the invention, the robots may provide logging data to the server. When a robot interacts with an order item, optionally it can perform one or more information captures. The robot can then send the one or more information captures to the server. The information capture can comprise one or more of a camera image, a video, a depth image, a laser measurement, and another information capture.

A destination may comprise one or more of a destination bin, a destination robot, and another destination.

The server is configured to track data points comprising one or more of inventory items, robots, destinations, and inventory storage. The server is further configured to receive a query.

The server is further configured to provide an answer to a query. For example, the server provides the answer to the query. For example, the query comprises a question regarding one or more data points. Queries may be entered by a human. Queries may be entered by a robot. Data may be stored indefinitely. Alternatively, data may be stored for a predetermined maximum time period, which may vary based on inventory item details such as purchase date, type of inventory item, buyer, and other inventory item details. For example, data may be stored until a final return date has expired, at which point data may not be needed as the seller may at that point be free of potential liability for any inventory items that may have been damaged in transit to the buyer.

In addition to tracking inventory, robots may also track other inventory items in the warehouse, such as forklifts. When a forklift is seen by a robot, the robot may transmit its location and other relevant information to the server. Relevant information may comprise one or more of forklift condition, dates and times when the forklift was used, inventory items that were transported using the forklift, overall forklift usage information, and other relevant forklift information. The server may then use the software to determine when forklift maintenance may be required. The server may then use the software to determine when forklift replacement may be required.

Data collected by the robots may comprise sensor data relating to a particular inventory storage, for example, a particular warehouse. Sensor data may comprise metrics and other sensor data. Metrics relating to a particular inventory storage may comprise one or more of a humidity, a percentage of air particulates, a temperature, and another metric. The robot may also use the sensor data to monitor the "health" of the inventory storage, for example, of the warehouse. If a robot detects conditions differing by preset parameters from preset conditions, the robot may alert the server through the network. The server may then alert an inventory storage manager.

For example, it will be understood by those skilled in the art that software used by the system and method for order fulfillment using robots may be located in any location in which it may be accessed by the system. It will be further understood by those of skill in the art that the number of variations of the network, location of the software, interactions of robots and humans, and the like are virtually limitless. It is intended, therefore, that the subject matter in the above description shall be interpreted as illustrative and shall not be interpreted in a limiting sense.

While the above representative embodiments have been described with certain components in exemplary configurations, it will be understood by one of ordinary skill in the art that other representative embodiments can be implemented using different configurations and/or different components.

For example, it will be understood by one of ordinary skill in the art that the order of certain steps and certain components can be altered without substantially impairing the functioning of the invention. For example, in FIG. 1, more than one stationary actor robot may do the picking. For example, in FIG. 1, more than one order robot may receive the picked order items. For example, one or more of the actor robot, the order robot, the inventory robot, and the packer robot may be the same. For example, the actor robot may be the same as the packer robot, with the order robot being a second distinct type of robot and the inventory robot being a third distinct type of robot. For example, one robot may communicate position information regarding a second robot.

The representative embodiments and disclosed subject matter, which have been described in detail herein, have been presented by way of example and illustration and not by way of limitation. It will be understood by those skilled in the art that various changes may be made in the form and details of the described embodiments resulting in equivalent embodiments that remain within the scope of the invention. It is intended, therefore, that the subject matter in the above description shall be interpreted as illustrative and shall not be interpreted in a limiting sense.

What is claimed is:

1. A system for order fulfillment using one or more robots, comprising:
   a server configured to receive an order comprising an order item;
   an inventory robot operably connected to the server, the inventory robot comprising order items;
   an actor robot operably connected to and selected by the server, the actor robot configured to perform one or more of receiving from the server a currently planned path for the actor robot and generating the currently planned path for the actor robot, the actor robot further configured to perform one or more of picking the order item, moving the order item, and positioning the order item; and
   an order robot operably connected to the server, the order robot configured to collect the order item, wherein the order item is positioned by the actor robot on the order robot so as to be accessible to the order robot, so as to perform order fulfillment using one or more robots.

2. The system of claim 1, wherein at least one robot communicates position information to the server.

3. The system of claim 2, wherein using the position information, the server transmits a currently planned path to the communicating robot.

4. The system of claim 3, wherein the communicating robot communicates one or more of its past position, its present position, its future position, and position information affecting its currently planned path.

5. The system of claim 4, wherein the communicating robot communicates position information affecting its currently planned path comprising position information regarding an obstacle affecting its currently planned path.

6. The system of claim 5, wherein the communicating robot communicates position information regarding an obstacle preventing timely and cost-effective execution of the currently planned path.

7. The system of claim 5, wherein the communicating robot communicates position information regarding an obstacle blocking the current planned path.

8. A system for order fulfillment using one or more robots, comprising:
   a server configured to receive an order comprising an order item;
   an inventory robot operably connected to the server, the inventory robot comprising order items;
   an actor robot operably connected to and selected by the server, the actor robot configured to perform one or more of receiving a currently planned path for the actor robot from the server and generating a currently planned path for the actor robot, the actor robot further configured to perform one or more of picking the order item, moving the order item, and positioning the order item; and an order robot operably connected to the server, the order robot configured to collect the order item, wherein the order item is positioned by the actor robot inside the order robot so as to be accessible to the order robot, so as to perform order fulfillment using one or more robots.

9. A method for order fulfillment using robots, comprising:

receiving, by a task robot, from a server, one or more of a selection of the task robot and a destination;

computing, by the task robot, a currently planned path configured to enable the task robot to reach the destination while optimizing criteria of interest;

executing, by the task robot, the currently planned path;

communicating position information, by the task robot, to the server;

determining, by the task robot, using the position information, that the task robot is positioned so as to be ready to perform a task relating to fulfillment of an order;

receiving the task, by the task robot, from the server, following the determination that the task robot is positioned so as to be ready to perform the task;

performing the task, by the task robot; and sending, to the server, by the task robot, a task confirmation confirmed that the task has been completed.

10. The method of claim 9, wherein the task robot comprises one or more of an inventory robot, an actor robot, an order robot, and a packer robot.

11. The method of claim 9, wherein the task robot comprises an inventory robot configured to perform one or more of picking and moving the order item.

12. The method of claim 9, wherein the task robot comprises an actor robot configured to perform one or more of picking the order item, moving the order item, and positioning the order item.

13. The method of claim 9, wherein the task robot comprises an order robot configured to collect the order item.

14. The method of claim 9, wherein the task robot comprises a packer robot configured to pack an order item into a container to be shipped.

15. The method of claim 9, wherein the step of performing comprises picking an order item.

16. The method of claim 15, wherein the step of performing comprises picking the order item from an inventory storage.

17. The method of claim 9, wherein the step of performing comprises packing an order item.

18. The method of claim 17, wherein the step of packing is performed by a packing robot.

19. The method of claim 17, wherein the step of performing further comprises shipping one or more of the one or more items.

20. The method of claim 9, wherein the step of computing the currently planned path comprises computing a currently planned path configured to enable the task robot to reach a destination while optimizing criteria of interest.

21. The method of claim 9, wherein the step of receiving the task comprises receiving a pick order.

22. The method of claim 21, wherein the step of sending comprises sending a pick confirmation confirming that the ordered items have been picked.

23. The method of claim 9, wherein the step of communicating comprises communicating one or more of a past robot position, a present robot position, a future robot position, and position information regarding an obstacle affecting the currently planned path.

24. The method of claim 23, wherein the step of communicating comprises communicating position information regarding an obstacle blocking the current planned path.

* * * * *